(12) United States Patent
Kameda et al.

(10) Patent No.: US 8,742,379 B2
(45) Date of Patent: Jun. 3, 2014

(54) WINDOW UNIT, WINDOW DEVICE, LASER APPARATUS, AND EXTREME ULTRAVIOLET LIGHT GENERATION SYSTEM

(75) Inventors: Hidenobu Kameda, Tochigi (JP); Masato Moriya, Tochigi (JP); Osamu Wakabayashi, Kanagawa (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 13/636,038

(22) PCT Filed: Jul. 5, 2011

(86) PCT No.: PCT/JP2011/065744
§ 371 (c)(1),
(2), (4) Date: Sep. 19, 2012

(87) PCT Pub. No.: WO2012/026228
PCT Pub. Date: Mar. 1, 2012

(65) Prior Publication Data
US 2013/0020499 A1 Jan. 24, 2013

(30) Foreign Application Priority Data

Aug. 27, 2010 (JP) .................................. 2010-191466
Mar. 30, 2011 (JP) .................................. 2011-075374

(51) Int. Cl.
*H01S 3/04* (2006.01)
(52) U.S. Cl.
CPC .................................... *H01S 3/0401* (2013.01)
USPC ........................................ 250/504 R; 372/35

(58) Field of Classification Search
USPC .................................. 250/504 R; 372/34, 35
See application file for complete search history.

(56) References Cited

U.S. PATENT DOCUMENTS

| 7,209,500 | B2 * | 4/2007 | Dane et al. ....................... 372/21 |
| 7,809,033 | B2 * | 10/2010 | Funaoka et al. ................ 372/35 |
| 8,173,984 | B2 * | 5/2012 | Moriya et al. ............. 250/504 R |
| 8,395,133 | B2 * | 3/2013 | Moriya et al. ............. 250/504 R |
| 2003/0123160 | A1 | 7/2003 | Zeller |
| 2003/0188681 | A1 | 10/2003 | Brandon |
| 2007/0272661 | A1 | 11/2007 | Whitehead et al. |
| 2009/0086017 | A1 | 4/2009 | Miyano |
| 2009/0180503 | A1 | 7/2009 | Funaoka et al. |
| 2012/0104290 | A1 * | 5/2012 | Nishisaka et al. ........ 250/504 R |

FOREIGN PATENT DOCUMENTS

JP 62-156890 A 7/1987

OTHER PUBLICATIONS

International Search Report issued in International Patent Application No. PCT/JP2011/065744 dated Oct. 10, 2011.

\* cited by examiner

*Primary Examiner* — Kiet T Nguyen
(74) *Attorney, Agent, or Firm* — McDermott Will & Emery LLP

(57) ABSTRACT

A window unit may include: a window configured to allow a laser beam to be transmitted therethrough; and a holder for holding the window at a periphery thereof, the holder being provided with a flow channel thereinside configured to allow a fluid to flow.

13 Claims, 21 Drawing Sheets

WINDOW UNIT, WINDOW DEVICE, LASER APPARATUS, AND EXTREME ULTRAVIOLET LIGHT GENERATION SYSTEM

CROSS-REFERENCE TO RELATED APPLICATIONS

The present application is the U.S. National Phase under 35 U.S.C. §371 of International Application No. PCT/JP2011/065744, filed on Jul. 5, 2011, which in turn claims priority from Japanese Patent Application No. 2010-191466 filed Aug. 27, 2010, and Japanese Patent Application No. 2011-075374 filed Mar. 30, 2011, the disclosures of which applications are incorporated by reference herein.

BACKGROUND

1. Technical Field

This disclosure relates to a window unit, a window device, a laser apparatus, and a system for generating extreme ultraviolet (EUV) light.

2. Related Art

In recent years, as semiconductor processes become finer, photolithography has been making rapid progress toward finer fabrication. In the next generation, microfabrication at 60 nm to 45 nm, and further, microfabrication at 32 nm and beyond will be required. Accordingly, in order to meet the demand for microfabrication at 32 nm and beyond, for example, an exposure apparatus is expected to be developed, in which a system for generating EUV light at a wavelength of approximately 13 nm is combined with a reduced projection reflective optical system.

Three kinds of systems for generating EUV light have been known in general, which include an LPP (Laser Produced Plasma) type system in which plasma generated by irradiating a target material with a laser beam is used, a DPP (Discharge Produced Plasma) type system in which plasma generated by electric discharge is used, and an SR (synchrotron radiation) type system in which orbital radiation is used.

SUMMARY

A window unit according to one aspect of this disclosure may include: a window configured to allow a laser beam to be transmitted therethrough; and a holder for holding the window at a periphery thereof, the holder being provided with a flow channel thereinside configured to allow a fluid to flow.

A window device according to another aspect of this disclosure may include: a window configured to allow a laser beam to be transmitted therethrough; a holder for holding the window at a periphery thereof, the holder being provided with an inlet opened in a surface of the holder, an outlet opened in the surface of the holder, and a flow channel thereinside configured to allow communication between the inlet and the outlet to allow a fluid to flow; and a cooling unit configured to have a cooling medium flow into the holder via the inlet.

A laser apparatus according to yet another aspect of this disclosure may include: an output unit configured to output a laser beam; an amplification unit configured to amplify the laser beam; and a window unit including a window and a holder, the window being provided at least at one side of input and output sides of the laser beam in the amplification unit and being configured to allow the laser beam to be transmitted therethrough, and the holder being provided with a flow channel thereinside configured to allow a fluid to flow.

A system for generating extreme ultraviolet light according to still another aspect of this disclosure may include: a window configured to allow a laser beam to be transmitted therethrough; a holder for holding the window at a periphery thereof, the holder being provided with an inlet opened in a surface of the holder, an outlet opened in the surface of the holder, and a flow channel thereinside configured to allow communication between the inlet and the outlet to allow a fluid to flow; a cooling unit configured to have a cooling medium flow into the holder via the inlet; a chamber to which the holder is mounted; a target supply unit configured to supply a target material into the chamber; and a collector mirror configured to collect light emitted from plasma generated when the target material is irradiated with the laser beam.

These and other objects, features, aspects, and advantages of this disclosure will become apparent to those skilled in the art from the following detailed description, which, taken in conjunction with the annexed drawings, discloses preferred embodiments of this disclosure.

DESCRIPTION OF PREFERRED EMBODIMENTS

Figure 1:
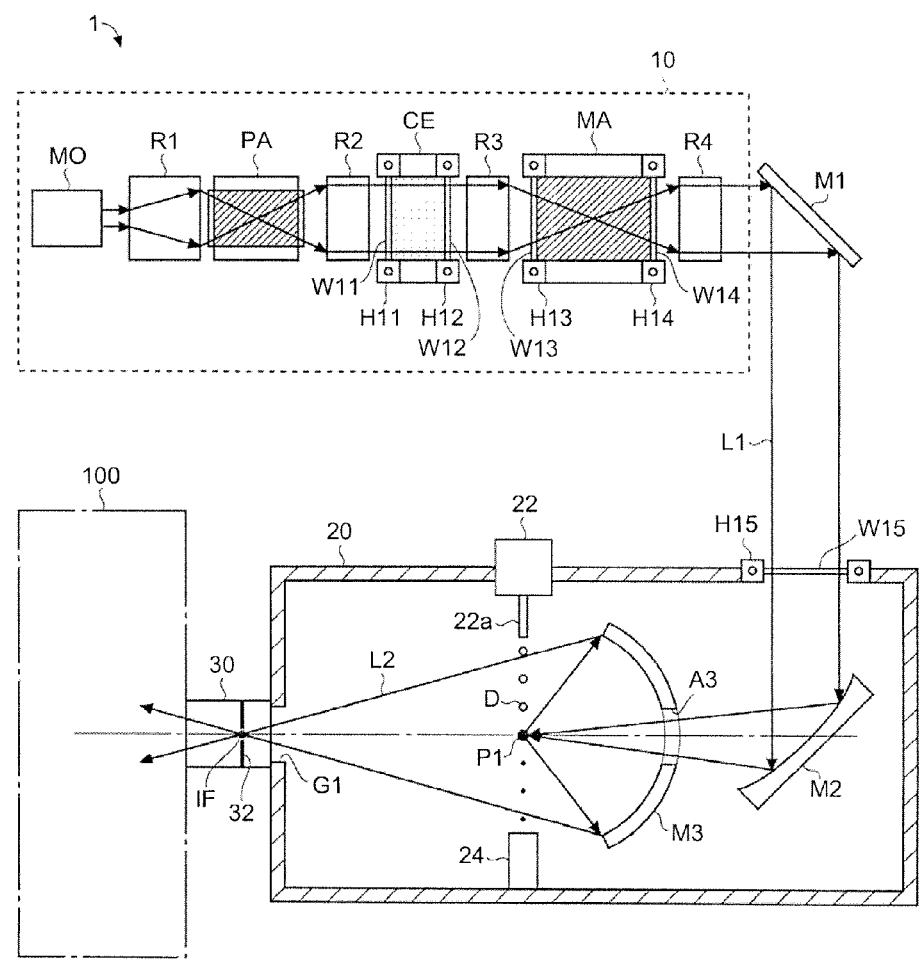
FIG. 1 schematically illustrates the configuration of a system for generating EUV light according to a first embodiment of this disclosure.

Hereinafter, selected embodiments for implementing this disclosure will be described in detail with reference to the accompanying drawings. In the subsequent description, each drawing merely illustrates shape, size, positional relationship, and so on, schematically to the extent that enables the content of this disclosure to be understood; thus, this disclosure is not limited to the shape, the size, the positional relationship, and so on, illustrated in each drawing. In order to show the configuration clearly, part of hatching along a section is omitted in the drawings. Further, numerical values indicated hereafter are merely preferred examples of this disclosure; thus, this disclosure is not limited to the indicated numerical values.

First Embodiment

A window unit, a window device, a laser apparatus, and a system for generating EUV light according to a first embodiment will be described in detail with reference to the drawings. In the description to follow, an LPP type system will be illustrated as an example, but without being limited thereto, a DPP type system or an SR type system may also be employed. In the first embodiment, a target material may be turned into plasma with single-stage laser irradiation, but without being limited thereto, a target material may be turned into plasma with laser irradiation of two or more stages. Further, this disclosure may be applied to a laser apparatus, a laser processing apparatus, and so forth.

FIG. 1 schematically illustrates the configuration of the system for generating EUV light according to the first embodiment. As illustrated in FIG. 1, a system 1 for generating EUV light may include: a driver laser 10 configured to output a laser beam L1, with which the target material is irradiated to thereby turned into plasma; a chamber 20 defining a space in which EUV light is generated; an optical system M1 arranged to guide the laser beam L1 outputted from the driver laser 10 into a chamber 20; and so forth.

The driver laser 10 may include: a master oscillator MO configured to output a seed beam; a relay optical system R1 arranged to expand the seed beam outputted from the master oscillator MO; a preamplifier PA configured to amplify the seed beam (laser beam) which has been expanded in diameter by the relay optical system R1; a relay optical system R2 arranged to collimate the amplified laser beam; a saturable absorber cell CE, through which the collimated laser beam may be transmitted; a relay optical system R3 arranged to shape the laser beam; a main amplifier MA configured to further amplify the shaped laser beam; a relay optical system R4 arranged to collimate an amplified laser beam L1; and so forth. The saturable absorber cell CE may be provided so as to suppress self-oscillation or to absorb a laser beam returning from the chamber.

The optical system M1 may include, for example, at least one high-reflection mirror disposed outside the chamber 20 for guiding the laser beam L1 outputted from the driver laser 10 into the chamber 20.

The chamber 20 may be provided with a window 15, an off-axis paraboloidal mirror M2, a target supply unit 22, a target collection unit 24, an EUV collector mirror M3, and so forth. The laser beam L1 may be introduced into the chamber 20 through the window 15. The off-axis paraboloidal mirror M2 may be configured to focus, in a plasma generation region P1, the laser beam L1 introduced into the chamber 20. The target supply unit 22 may be configured to supply a target material in the form of a droplet DL to the plasma generation region P1. A target material that has passed through the plasma generation region P1 may be collected into the target collection unit 24. The EUV collector mirror M3 may be provided with a through-hole, through which the laser beam L1 reflected by the off-axis paraboloidal mirror M2 may travel from the rear side thereof toward the plasma generation region P1. The EUV collector mirror M3 may selectively reflect EUV light L2 at a desired wavelength (13.5 nm), among rays of light emitted from plasma generated in the plasma generation region P1 when the target material is irradiated with the laser beam L1, such that the EUV light L2 may be focused at an intermediate focus IF defined in an exposure apparatus connection unit 30. The chamber 20 and the exposure apparatus connection unit 30 may be connected airtightly to each other with a gate valve G1 provided therebetween. The EUV light L2 having been focused at the intermediate focus IF may be guided into an exposure apparatus 100 through an aperture 32 defined near the intermediate focus IF. The EUV light L2 guided into the exposure apparatus 100 may, for example, be used for semiconductor exposure. Alternatively, the EUV light L2 may be guided into a processing apparatus or the like, instead of the exposure apparatus 100, in which the EUV light may be used.

An optical window, such as the window used in the system for generating EUV light, through which a laser beam of high output power may be transmitted, may be heated with the laser beam incident thereon, and with this, the optical properties thereof may change. Such a change in the optical properties due to a heat load may prevent the laser beam to be focused appropriately.

Thus, an optical input window W11 and an optical output window W12 of the saturable absorber cell CE, an optical input window W13 and an optical output window W14 of the main amplifier MA, and the window W15 of the chamber 20 may preferably be held by window holders H11 through H15, respectively, each being provided with a cooling mechanism, for example. Examples of the window, the window holder, and the window unit including the window and the window holder according to the first embodiment will be described in detail with reference to the drawings. Here, each window and each window holder may be similar in configuration; thus, hereinafter, a window W1, a window holder H1, a window unit U1 including the window W1 and the window holder H1, and a window device D1 including the window unit U1 will be illustrated as examples.

Figure 2:
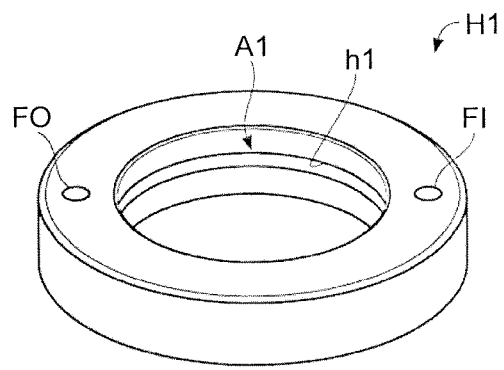
FIG. 2 is a perspective view schematically illustrating the configuration of a window holder according to the first embodiment.
Figure 3:
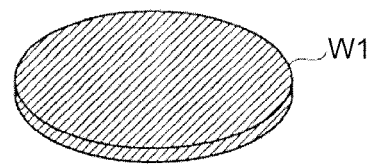
FIG. 3 is a perspective view schematically illustrating the configuration of a window according to the first embodiment.
Figure 4:
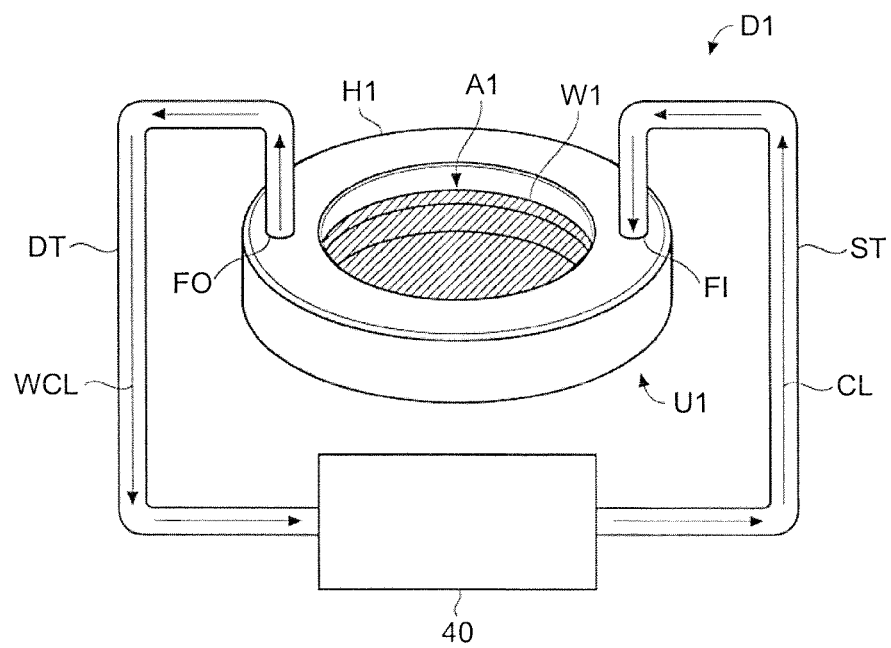
FIG. 4 is a perspective view schematically illustrating the configuration of a window device, which includes an assembly of the window and the window holder according to the first embodiment.

FIG. 2 is a perspective view schematically illustrating the configuration of the window holder according to the first embodiment. FIG. 3 is a perspective view schematically illustrating the configuration of the window according to the first embodiment. FIG. 4 is a perspective view schematically illustrating the configuration of the window device, which may include an assembly (window unit) of the window and the window holder according to the first embodiment.

As illustrated in FIG. 2, the window holder H1 may, for example, be annular in shape defining an opening A1 thereinside. The opening A1 may not need to be circular, and it may be modified into various shapes, such as an ellipse, a quadrilateral, and so forth. A groove h1 may be provided annularly along an inner surface of the window holder H1. As illustrated in FIG. 4, for example, the window W1 of a shape (discshape, for example) in accordance with the shape of the opening A1 shown in FIG. 3 may be fitted into the groove h1. With this, the window W1 may be held by the window holder H1. The window W1 may be fitted into the window holder H1 prior to brazing.

A material of the window W1 may preferably have sufficient transmittance to a laser beam at a given wavelength to be transmitted through the window W1. In particular, in the window W1, through which a high-power laser beam may be transmitted, thermal deformation may cause the optical properties thereof to be changed; thus, it is important that the material of the window W1 has a low thermal expansion coefficient. In addition, the material of the window W1 may preferably be hard and excel in thermal stability and heat dissipation performance. Such a material may include, for example, diamond (including synthetic diamond), and the like. Aside from diamond, a transmissive optical element material having a relatively low thermal expansion coefficient, as shown in Table 1 below, may be used as well, for example.

TABLE 1

| Material | Termal Expansion Coefficient [$\times 10^{-6}$/° C.] |
|---|---|
| Zinc Selenide (ZnSe) | 7.6 |
| Gallium Arsenide (GaAs) | 6 |
| Diamond | 1 |

As a material of the window holder H1, a material that is hard and has a low thermal expansion coefficient and high thermal conductivity, such as silicon carbide (SiC), aluminum nitride (AlN), or the like, may preferably used. Some examples of the material suitable for constituting the window H1 are listed in Table 2 below. Aside from the materials listed in Table 2, a metal material such as molybdenum may be used as well. Aside from the materials listed herein, various materials may also be used as long as they can realize the functions required for the window holder H1 according to the first embodiment.

TABLE 2

| Material | Vickers Hardness [Kg/mm$^2$] | Termal Expansion Coefficient [$\times 10^{-6}$/° C.] | Termal Conductively [W/m · K] |
|---|---|---|---|
| Aluminum Nitride (AlN) | 1040 | 4.8 | 400 |
| Silicon Carbide (SiC) | 2300 | 4.0 | 150 |
| Alumina (Al$_2$O$_3$) | 1800 | 7.9 | 60 |
| Silicon Nitride (SiN) | 1480 | 2.6 | 60 |
| Zirconia (ZrO$_2$) | 1350 | 9.6 | 14 |
| Alumina + Titanium Carbide (Al$_2$O$_3$ + TiC) | 2000 | 7.5 | 50 |

TABLE 2-continued

| Material | Vickers Hardness [Kg/mm$^2$] | Termal Expansion Coefficient [×10$^{-6}$/° C.] | Termal Conductively [W/m · K] |
|---|---|---|---|
| Titanium Carbide Cermet | 1900 | 8.1 | 30 |

The difference between an expansion amount in the window W1 and an expansion amount in the window holder H1 due to a temperature change may preferably be small. Accordingly, it is preferable that the window W1 and the window holder H1 may be configured of materials similar in the thermal expansion coefficient. For example, an absolute value of a difference Δε [ppm] between the thermal expansion coefficient of the window W1 and the thermal expansion coefficient of the window holder H1 may preferably satisfy Expression 1 below, where D [mm] is an outer diameter of the window W1.

$$|\Delta\epsilon| \leq \frac{1}{2} D \times 10^{-3}$$ Expression 1

The window holder H1 may be provided with an inlet FI and an outlet FO. A cooling medium CL, such as water, oil, a liquid metal, and so on, may be introduced into the window holder H1 through the inlet FI, and the cooling medium CL, having circulated through the window holder H1, may be discharged through the outlet FO as waste cooling liquid WCL. As illustrated in FIG. 4, the cooling medium CL supplied from a cooling unit 40 may be flowed into the window holder H1 through a supply pipe ST connected to the inlet FI. The cooling medium CL, having circulated through the window holder H1, may be flowed out as the waste cooling liquid WCL through the outlet FO. The waste cooling liquid WCL having been flowed out through the outlet FO may be sent back to the cooling unit 40 via a drain pipe DT connected to the outlet FO. The cooling unit 40 may, for example, be configured to cool the waste cooling liquid WCL flowed thereinto through the drain pipe DT and subsequently supply the cooled waste cooling liquid WCL back into the supply pipe ST as the cooling medium CL.

Figure 5:
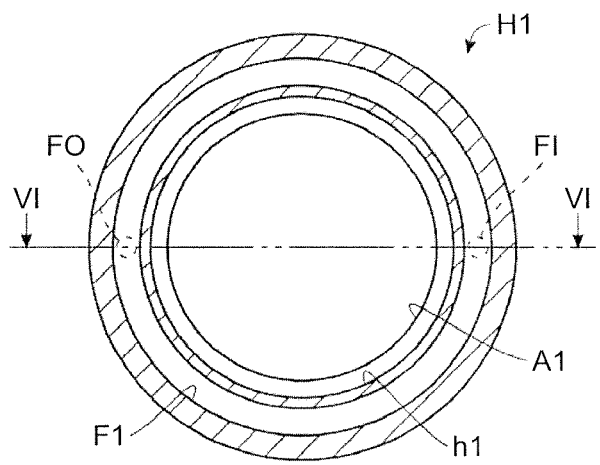
FIG. 5 is a sectional view, taken along a plane parallel to a window plane, schematically illustrating the configuration of the window holder according to the first embodiment.
Figure 6:
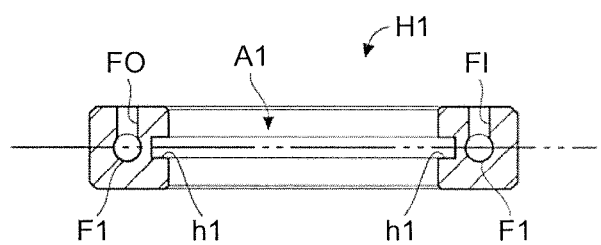
FIG. 6 is a sectional view, taken along VI-VI plane, schematically illustrating the configuration of the window holder shown in FIG. 5.

Next, the internal configuration of the window holder according to the first embodiment will be described with reference to the drawings. FIG. 5 is a sectional view, taken along a plane parallel to a window plane, schematically illustrating the configuration of the window holder H1 according to the first embodiment. FIG. 6 is a sectional view, taken along VI-VI plane, of the window holder H1 shown in FIG. 5. The window plane here refers to a plane parallel to a surface of the window W1 on which a laser beam is incident.

As illustrated in FIG. 5, a flow channel F1, which may be annular in shape, may be provided inside the window holder H1 such that the cooling medium CL may circulate thereinside so as to cool at least the vicinity of the inner side surface of the window holder H1 substantially uniformly. The flow channel F1 may allow communication between the inlet FI and the outlet FO which are opened at the outer surface of the window holder H1. As illustrated in FIG. 6, for example, the outlet FO may be located across from the inlet FI with the axis of the window holder H1 therebetween. The configurations of the flow channel F1, the inlet FI, and the outlet FO, however, are not limited to the aforementioned configurations, and various modifications can be made as long as the cooling medium CL may be allowed to flow inside the flow channel F1 so as to cool the inner side surface of the window holder H1 substantially uniformly.

Figure 7:
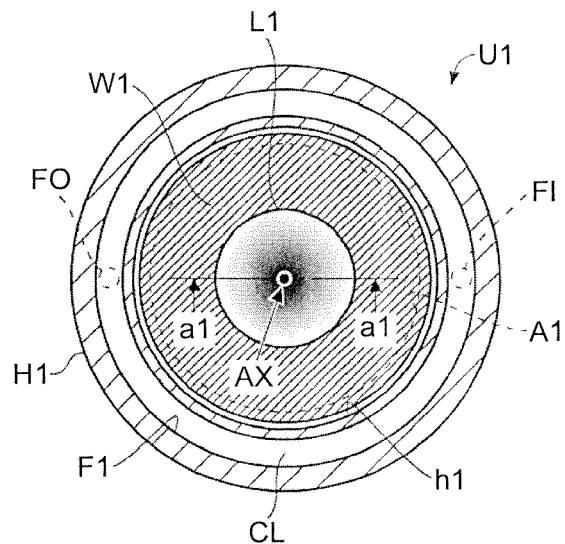
FIG. 7 is a schematic diagram illustrating the relationship among a window unit, a cross-sectional shape of a laser beam, and a position of incidence of the laser beam according to the first embodiment.
Figure 8A:
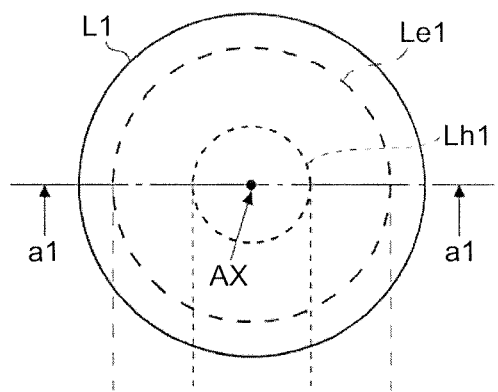
FIG. 8A is a diagram illustrating two-dimensional beam intensity distribution along a cross-section of the laser beam according to the first embodiment.
Figure 8B:
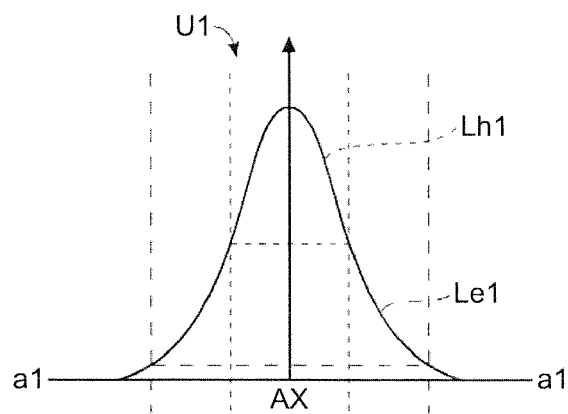
FIG. 8B is a graph illustrating the beam intensity distribution shown in FIG. 8A.

Next, the temperature distribution in the window W1 while the driver laser 10 is in operation will be described in detail with reference to the drawings. FIG. 7 schematically illustrates the relationship among the window unit, a cross-sectional shape of the laser beam, and a position of incidence of the laser beam according to the first embodiment. FIGS. 8A and 8B show the beam intensity distribution along the cross-section of the laser beam according to the first embodiment. As illustrated in FIG. 7, the laser beam L1 may be incident on the window W1 of the window unit U1 substantially perpendicularly to the window plane. The laser beam L1 may preferably be incident on the window W1 such that the beam axis AX (the center in the cross-section) thereof may substantially coincide with the center of the window W1, for example. As illustrated in FIG. 8A, the beam intensity distribution along the cross-section of the laser beam L1 may be such that the beam intensity is decreased toward the outer periphery with the beam intensity at the beam axis AX being the peak. Further, as illustrated in FIG. 8B, the beam intensity along the cross-section of the laser beam L1 may gradually decrease isotropically with the beam axis AX being the center. In FIGS. 8A and 8B, a dashed line Lh1 shows the boundary of a region within which the beam intensity is at or above the half the peak beam intensity, and a dashed line Le1 shows the boundary of a region within which the beam intensity is at or above $1/e^2$ (e being a natural number) of the peak beam intensity. As indicated with the dashed lines Lh1 and Let, it is preferable that the shapes of the respective regions are coaxial with each other with the beam axis AX being the center thereof. As an example, an outer boundary of an irradiation region on the window surface or the cross-sectional shape of the laser beam L1 may be defined by a shape defined by the dashed line Lh1 or Le1. Alternatively, the outer boundary of the irradiation region on the window surface or the cross-sectional shape of the laser beam L1 may be defined by any shape in which heat input distribution in the window by the laser beam L1 is reflected.

At least one among the shape of the opening A1 in the window holder H1, the shape of the flow channel F1 provided inside the window holder H1, and the shape of the outer circumference of the window holder H1 may be substantially similar to the shape of the window W1 or the cross-sectional shape of the laser beam L1. Alternatively, the respective shapes may be such that the outer circumferences thereof are substantially similar to and are oriented substantially similarly to the shape of the window W1 or to the shape of the irradiation region by the laser beam L1. In this example, as illustrated in FIG. 7, a case where the shape of the opening A1 in the window holder H1, the shape of the flow channel F1 provided inside the window holder H1, and the shape of the outer circumference of the window holder H1 may all be circular with respect to the circular cross-sectional shape of the laser beam is illustrated.

Figure 9:
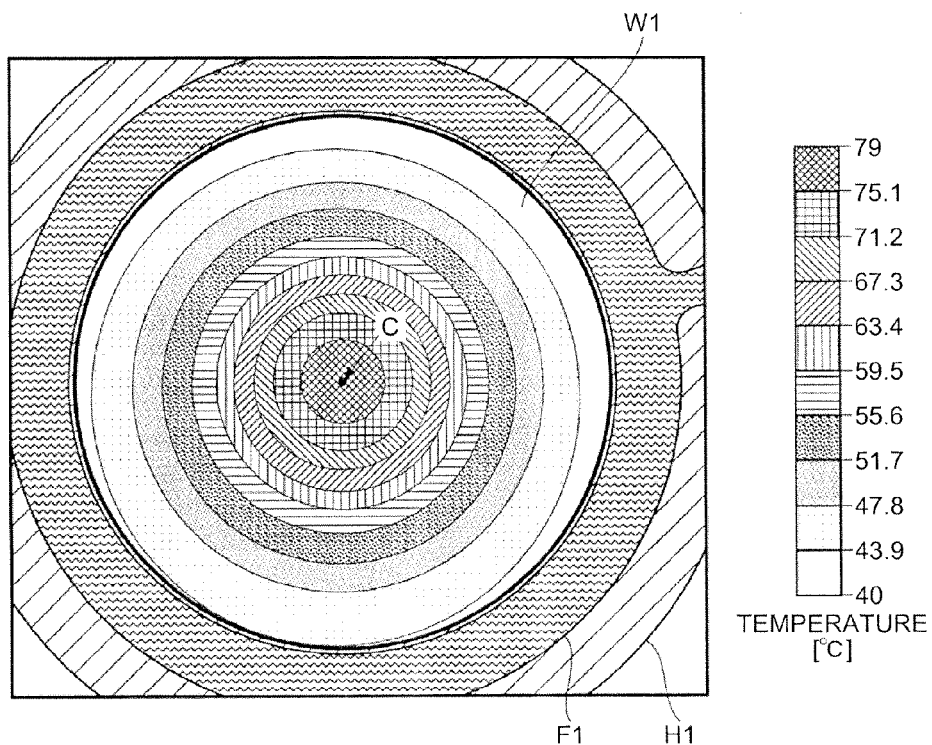
FIG. 9 schematically illustrates simulation results of temperature distribution in the window on which the laser beam is incident as shown in FIGS. 7 through 8B.
Figure 10:
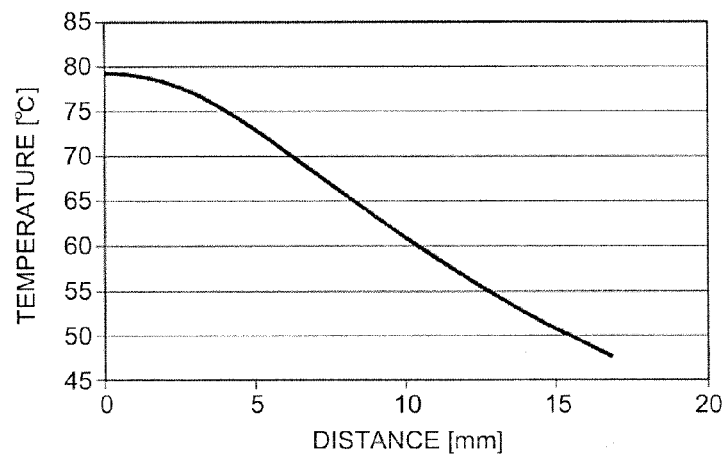
FIG. 10 is a graph illustrating the relationship between the distance from the center of the window and the temperature at respective positions in the window on which the laser beam is incident as shown in FIGS. 7 through 8B.

Next, a simulation result in which the configuration illustrated in FIGS. 7, 8A, and 8B is applied will be described in detail with reference to the drawings. FIG. 9 schematically illustrates simulation results of temperature distribution in the window on which the laser beam is incident as shown in FIGS. 7 through 8B. FIG. 10 is a graph illustrating the relationship between the distance from the center of the window and the temperature at respective positions in the window on which the laser beam is incident as shown in FIGS. 7 through 8B. The cooling medium CL may be made to flow inside the window holder H1 through a channel along the outer periphery of the window, the channel being distanced from the outer periphery with a substantially constant distance therebetween, while the system 1 for generating EUV light is in operation. With this, as illustrated in FIG. 9, the heat in the window holder H1 may be diffused substantially uniformly, and as a result, the temperature distribution in the window W1 may substantially be axisymmetric with respect to the center portion C. At this time, as illustrated in FIG. 10, the temperature distribution in the window W1 may be such that the temperature gradually decreases from the center portion C toward the outer periphery of the window W1. Accordingly, it is appreciated from the simulation results that a deformation in the window W1 and a bias in the reflectance distribution in the window W1 due to the bias in the temperature distribution can be reduced.

As has been described above, the window W1 may only need to allow the laser beam L1 at a desired wavelength (for example, approximately 10.6 μm) to be transmitted therethrough. The window holder W1 may hold the window W1 at the outer periphery thereof, and may be provided with the flow channel F1 thereinside through which the liquid cooling medium CL flows, the flow channel F1 being located close to the outer periphery of the window W1.

Further, the window W1 may be deposited, fused, or adhered to the window holder H1 at one side or both sides of the window W1.

Second Embodiment

A window unit, a window device, a laser apparatus, and a system for generating EUV light according to a second embodiment will be described in detail with reference to the drawings. In the description to follow, detailed description of the configurations similar to those in the first embodiment will be omitted, while the reference may be made to the configurations in the first embodiment.

Figure 11:
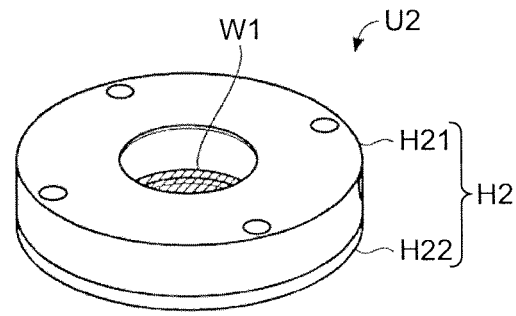
FIG. 11 is a perspective view schematically illustrating the configuration of a window unit according to a second embodiment of this disclosure.
Figure 12:
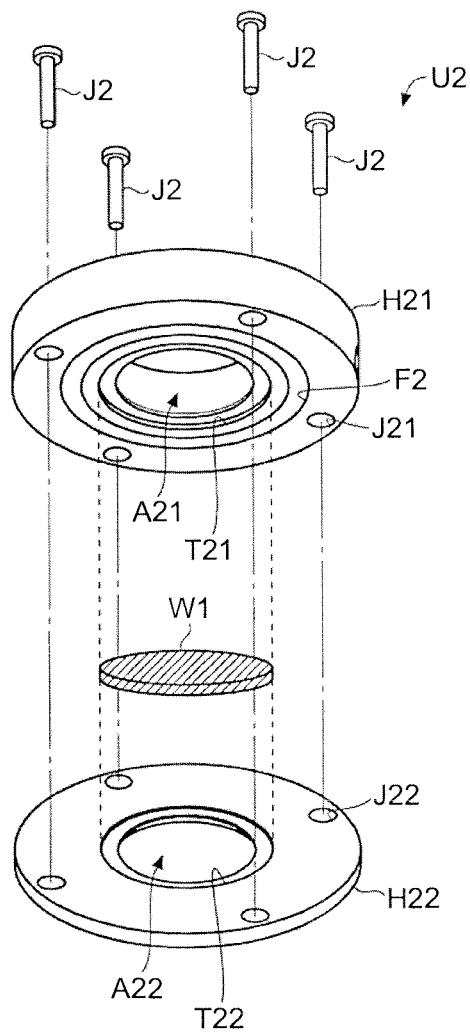
FIG. 12 is an exploded view of the window unit shown in FIG. 11.

The system for generating EUV light according to the second embodiment may be similar in configuration to the system 1 for generating EUV light according to the first embodiment. However, in the second embodiment, a window holder H2 of the configuration illustrated below, for example, may be adopted in place of the window holders H11 through H15. FIG. 11 is a perspective view schematically illustrating the configuration of an assembly (window unit) of the window and the window holder according to the second embodiment. FIG. 12 is an exploded view schematically illustrating the configuration of the window holder shown in FIG. 11.

As illustrated in FIG. 11, the window holder H2 may be an assembly including, for example, a cover holder H21 and a base holder H22. The window W1 may be held between the cover holder H21 and the base holder H22, for example. The surfaces of the window W1 may be fixed to the respective surfaces of the cover holder H21 and of the base holder H22 facing each other with the window W1 therebetween by deposition, fusion, brazing, adhesion, or the like. In addition to a welding technique in which ultrasonic waves, vibration, induction, high-frequency waves, heat, or the like is used, a welding technique in which a laser beam, an ion beam, or the like is used may also be employed. For adhesion, various adhesives, such as an inorganic adhesive, an organic adhesive, and so forth, can be used. Here, it is preferable that an adhesive with high thermal conductivity and excels in sealing performance may be used. The window W1 and the window holder H2 being connected to each other in this way, an increase in an heat transmission area, a decrease in irregularity in a heat transmission path from the window holder H2 to the window W1 may be achieved. Accordingly, the window W1 may be cooled more efficiently and more uniformly.

The configuration of a window unit U2 will be described in detail below. As illustrated in FIG. 12, the cover holder H21 may be annular with an opening A21 defined at the center thereof. A groove T21 for positioning the window W1 with respect to the opening A21, for example, may be formed on a surface of the cover holder H21 facing the base holder H22. The base holder H22 may be annular with an opening A22 defined therein, the opening A22 being provided such that the opening A21 and the opening A22 substantially overlap each other when the base holder H22 is assembled with the cover holder H21. A groove T22 for positioning the window W1 may be formed, for example, on a surface thereof facing the cover holder H21. The grooves 21 and 22 may form a groove for holding the window W1 at the periphery thereof when the cover holder H21 and the base holder H22 are assembled.

The cover holder H21 and the base holder H22 may be provided with bolt holes J21 and J22, respectively, which are in communication with each other when the cover holder H21 and the base holder H22 are assembled. A bolt J2 for engaging the cover holder H21 and the base holder H22 may be inserted into the bolt holes J21 and J22 from the cover holder H21 side. A screw portion provided at the leading end of the bolt J2 may be fitted into a threaded hole provided at a mount portion of the chamber 20, for example. With this, the window holder H2 may be fixed to the chamber 20 or the like. Alternatively, the window holder H2 may be fixed to the saturable absorber cell CE, the main amplifier MA, the chamber 20, and so forth via a metal seal or an O-ring (not shown).

Figure 13:
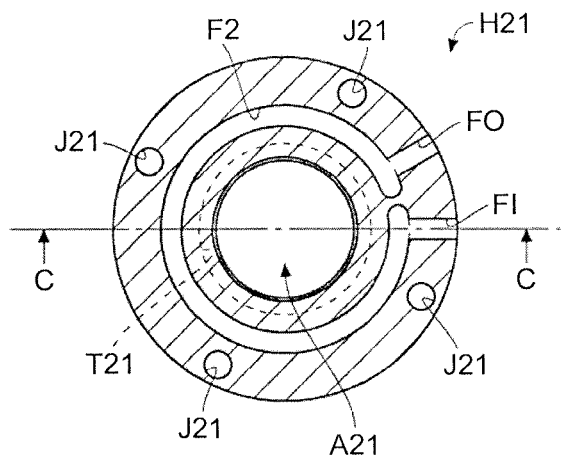
FIG. 13 is a sectional view, taken along a plane parallel to a window plane, schematically illustrating the configuration of the window holder according to the second embodiment.
Figure 14:
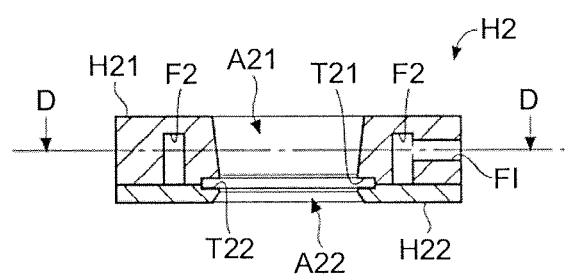
FIG. 14 is a sectional view, taken along XIV-XIV plane, schematically illustrating the configuration of the window holder shown in FIG. 13.

The internal configuration of the window holder according to the second embodiment will be described in detail with reference to the drawings. FIG. 13 is a sectional view, taken along a plane parallel to the window plane, schematically illustrating the configuration of the window holder according to the second embodiment. FIG. 14 is sectional view, taken along XIV-XIV plane, schematically illustrating the configuration of the window holder shown in FIG. 13.

As illustrated in FIG. 13, a flow channel F2, which may be substantially annular in shape, may be formed inside the cover holder H21, which may also be annular in shape, and the cooling medium CL may be flowed through the flow channel F2 so as to be capable of cooling the inner diameter side surface of the window holder H2 substantially uniformly, as in the window holder H1. The flow channel F2 may allow communication between the inlet FI and the outlet FO which are opened in the outer surface of the cover holder H21, for example. Alternatively, the flow channel F2 may be configured such that an annular groove is formed on a surface of the cover holder H21 facing the base holder H22 and the groove is fluid-tightly sealed by the base holder H22, as illustrated in FIG. 14. The flow channel F2 may not necessarily need to be annular, and as illustrated in FIG. 13, part thereof may be discontinued. If this is the case, the inlet FI and the outlet FO may preferably be in communication with the flow channel F2 near the disconnected portions, respectively. With this, the cooling medium CL may be allowed to circulate substantially throughout the flow channel F2. As a result, the window W1 held in the window holder H2 may be cooled from the outer periphery thereof.

As has been described above, the window W1 may be disc-shaped. In this case, the flow channel F2 defined inside the window holder H2 may be arranged annularly either at outer side or inner side relative to the periphery of the window W1, as mentioned above. In this configuration, the flow channel F2 defined inside the window holder H2 may be discontinued at part thereof. In this case, the inlet FI and the outlet FO opened in the outer surface of the window holder H2 may be connected to the respective discontinued ends of the flow channel F2.

The window holder H2 may include the base holder H22 arranged to be in contact with one surface of the window W1 at the outer periphery thereof, and the cover holder H22 arranged to be in contact with the other surface of the window W1 at the outer periphery thereof. In this configuration, the cover holder H21 may be provided with the flow channel F2, serving as a first groove, in the surface that comes in contact with the base holder H22, and the base holder H22 may be provided with a flow channel, serving as a second groove, in the surface that comes in contact with the cover holder H21, the flow channel being arranged so as to be aligned with the flow channel F2. In this case, the flow channel F2 and the second groove may together constitute a flow channel for the cooling medium CL to be flowed thereinside.

Third Embodiment

Figure 15:
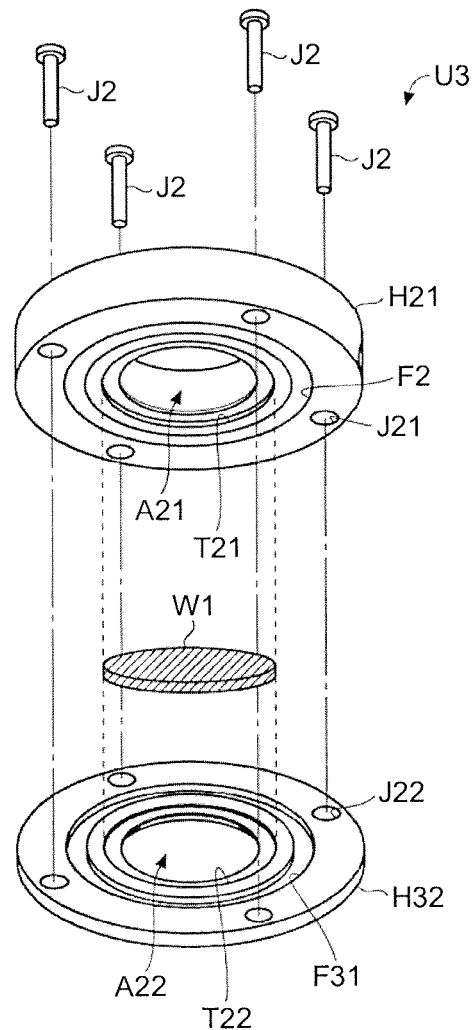
FIG. 15 is an exploded view schematically illustrating the configuration of a window unit according to a third embodiment of this disclosure.
Figure 16:
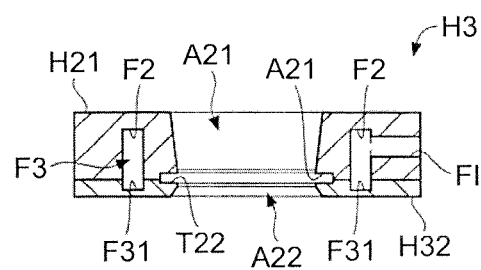
FIG. 16 is a sectional view, taken along a plane perpendicular to a window plane, schematically illustrating the configuration of the window holder shown in FIG. 15.

A window unit, a window device, a laser apparatus, and a system for generating EUV light according to a third embodiment will be described in detail with reference to the drawings. In the description to follow, detailed description of the configurations similar to those in the first or second embodiment will be omitted, while the reference may be made to the configurations in the first and second embodiments. The system for generating EUV light according the third embodiment may be similar in configuration to the system 1 for generating EUV light according to the first embodiment. However, in the third embodiment, a window holder H3 of the configuration described below may be adopted in place of the window holders H11 through H15. FIG. 15 is an exploded view schematically illustrating the configuration of the window unit according to the third embodiment. FIG. 16 is a sectional view, taken along a place perpendicular to the window plane, schematically illustrating the configuration of the window holder shown in FIG. 15.

As may be apparent from the comparison between FIGS. 15 and 12 and between FIGS. 16 and 14, a window unit U3 according to the third embodiment may be similar in configuration to the window unit U2 according to the second embodiment, but may differ in that the base holder H22 may be replaced by a base holder H32.

The base holder H32 may be similar in configuration to the base holder H22, but may be provided with a flow channel F31, which may be annular in shape, being opened in the surface thereof facing the cover holder H21. The flow channel F31 may constitute a flow channel F3 when the cover holder H21 and the base holder H32 are assembled. That is, in the third embodiment, the flow channel F3, of which the cross-section may extend from the cover holder H21 to the base holder H32, may be defined inside the assembled window holder H3. With this, the cooling medium CL may be allowed to flow through the flow channel F3, whereby the window W1 held in the window holder H3 may be cooled from the outer periphery thereof.

Fourth Embodiment

Figure 17:
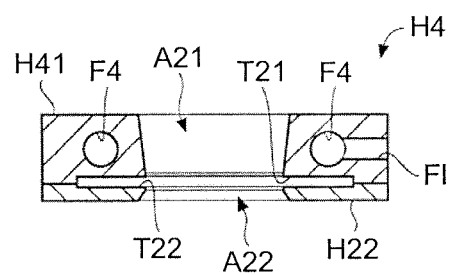
FIG. 17 is a sectional view, taken along a plane perpendicular to a window plane, schematically illustrating the configuration of a window holder according to a fourth embodiment of this disclosure.

A window unit, a window device, a laser apparatus, and a system for generating EUV light according to a fourth embodiment will be described in detail with reference to the drawings. In the description to follow, detailed description of the configurations similar to those in the first through third embodiments will be omitted, while the reference may be made to the configurations in the first through third embodiments. The system for generating EUV light according to the fourth embodiment may be similar in configuration to the system 1 for generating EUV light according to the first embodiment. However, in the fourth embodiment, a window holder H4 of configuration described below may be adopted in place of the window holders H11 through H15, for example. FIG. 17 is a sectional view, taken along a plane perpendicular to the window plane, schematically illustrating the configuration of the window holder according to the fourth embodiment.

As may be apparent from the comparison between FIGS. 17 and 14, the window holder H4 according to the fourth embodiment may be similar in configuration to the window holder H2 according to the second embodiment, but may differ in that the cover holder H21 may be replaced by a cover holder H41.

The cover holder 41 may be similar in configuration to the cover holder H21, but may differ in that the flow channel F2 may be replaced by a flow channel F4. The flow channel F4, as the flow channel F2, may be substantially annular. The cross-section of the flow channel F4 is not limited to be circular, and may be in various shapes. The flow channel F4, which may be substantially annular in shape, may be arranged such that at least the inner circumferential side thereof is located at the inner side of the outer periphery of the annular groove T21, that is, the outer periphery of the window W1, as viewed in the direction perpendicular to the surface of the window W1. This configuration may allow the window W1 to be cooled efficiently from the portion closer to the center of the window W1. However, the flow channel F4 may preferably not be opened at least in the surface facing the base holder H22. With this, a leak from the portion that is in contact with the window W1 can be prevented.

Fifth Embodiment

Figure 18:
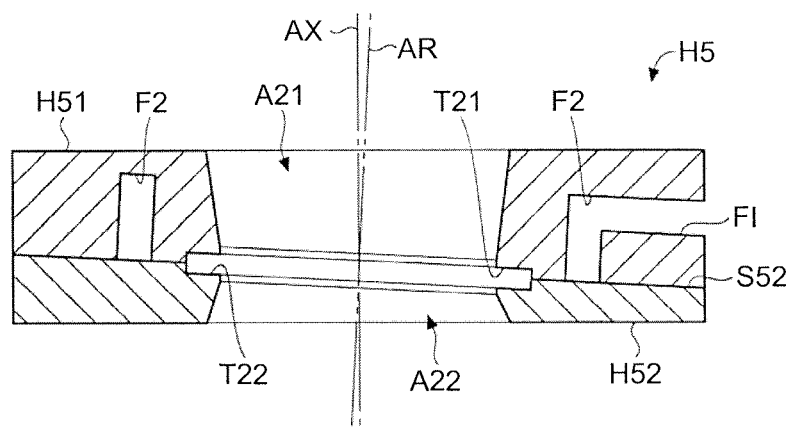
FIG. 18 is a sectional view, taken along a plane perpendicular to a window plane, schematically illustrating the configuration of a window holder according to a fifth embodiment of this disclosure.

A window unit, a window device, a laser apparatus, and a system for generating EUV light according to a fifth embodiment will be described in detail with reference to the drawings. In the description to follow, detailed description of the configurations similar to those in the first through fourth embodiments will be omitted, while the reference may be made to the configurations in the first through fourth embodiments. The system for generating EUV light according to the fifth embodiment may be similar in configuration to the system 1 for generating EUV light according to the first embodiment. However, in the fifth embodiment, a window holder H5 of configuration described below may be adopted in place of the window holders H11 through H15, for example. FIG. 18 is a sectional view, taken along a plane perpendicular to the window plane, schematically illustrating the configuration of the window holder according to the fifth embodiment.

As illustrated in FIG. 18, the window holder H5 according to the fifth embodiment may hold the window W1 such that a perpendicular AR of the window plane is inclined with respect to the beam axis AX of the laser beam L1 to be outputted from the driver laser 10 and incident on the window W1. In the fifth embodiment, a contact surface S52 of the base holder H52, at which the base holder H52 makes contact with the cover holder H51, is inclined with respect to the plane perpendicular to the beam axis AX so that the groove T22 for holding the window W1 therein, for example, is inclined with respect to the plane perpendicular to the beam axis AX. In accordance with this, a contact surface S52 of the cover holder H51, at which the cover holder H51 makes contact with the base holder H52, is inclined with respect to the plane perpendicular to the beam axis AX so that the groove T21 for holding the window W1 therein, for example, is inclined with respect to the plane perpendicular to the beam axis AX. In this way, the window W1 being inclined with respect to the beam axis AX of the laser beam L1, part of the laser beam L1 reflected by the window W1 may be prevented from returning toward the driver laser 10.

In the fifth embodiment, the window holder H5 may be employed in either one or both of the input and output sides of the laser beam L1 in optical systems (for example, saturable absorber cell CE, main amplifier MA, and so forth).

As has been described above, the window holder H5 may be arranged to hold the window W1 such that the surface of the window W1, on which the laser beam is incident, is inclined with respect to the surface of the preamplifier PA, the main amplifier MA, the saturable absorber cell CE, the chamber 20, and so forth, onto which the window holder H5 may be mounted.

Sixth Embodiment

A window unit, a window device, a laser apparatus, and a system for generating EUV light according to a sixth embodiment will be described in detail with reference to the drawings. In the description to follow, detailed description of the configurations similar to those in the first through fifth embodiments will be omitted, while the reference may be made to the configurations in the first through fifth embodiments.

According to the embodiments described above, the window W1 can be cooled substantially uniformly from the outer periphery thereof. When the beam intensity distribution of the laser beam L1 is made to be axisymmetric with respect to the beam axis AX thereof and the configuration is made such that the beam axis AX passes the center of the window W1, the heat distribution in the window W1 may be made substantially point symmetric with respect to the center of the window W1. In this case, it should be appreciated that the wavefront of the laser beam L1 transmitted through the window W1 can easily be corrected with a wavefront correction unit configured of an uncomplicated optical element such as a mirror or the like. Accordingly, in the sixth embodiment, the wavefront of the laser beam L1 according to any one of the first through fifth embodiments described above may be corrected with a wavefront correction unit. In the description to follow, for the sake of simplicity, a case where the wavefront of the laser beam L1 according to the first embodiment is corrected with the wavefront correction unit will be illustrated as an example.

Figure 19:
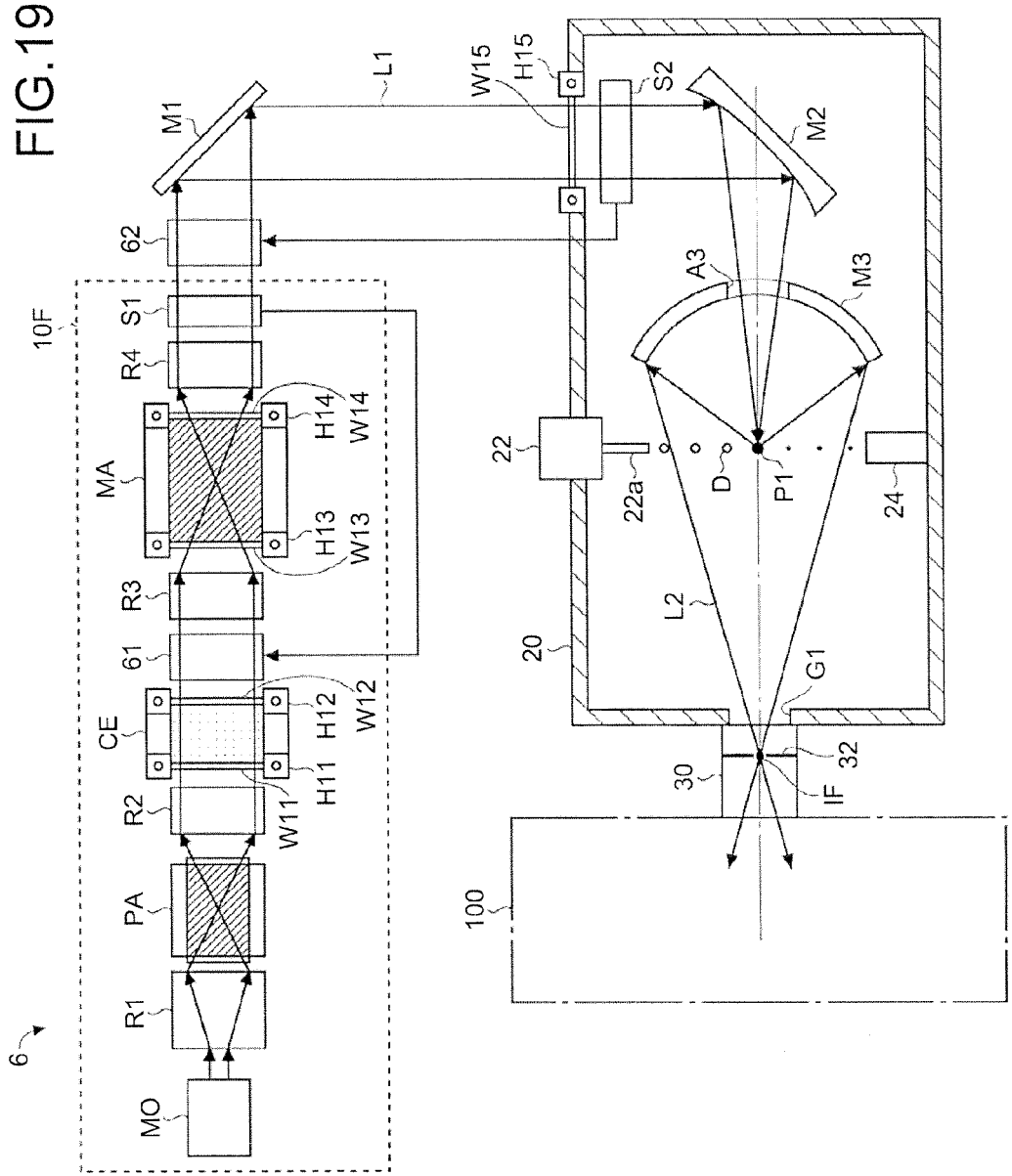
FIG. 19 schematically illustrates the configuration of a system for generating EUV light according to a sixth embodiment of this disclosure.

FIG. 19 schematically illustrates the configuration of the system for generating EUV light according to the sixth embodiment. As may be apparent from the comparison between FIGS. 19 and 1, a system 6 for generating EUV light according to the sixth embodiment may be similar in configuration to the system 1 for generating EUV light shown in FIG. 1, but may differ in that the system 6 for generating EUV light may further include wavefront correction units 61 and 62 and wavefront sensors S1 and S2. The wavefront correction units 61 and 62 may correct the wavefront of the laser beam L1. The wavefront sensors S1 and S2 may detect the shape of the wavefront (area of the cross-section may be included) of the laser beam L1. The wavefront correction units 61 and 62 and the wavefront sensors S1 and S2 may constitute part of a driver laser 10F, or may be configured as separate elements from the driver laser 10F.

The wavefront correction unit 61 may be disposed upstream of the main amplifier MA with the relay optical system R3 provided therebetween. A wavefront detection result by the wavefront sensor S1 disposed downstream of the main amplifier MA with the relay optical system R4 provided therebetween may be inputted to the wavefront correction unit 61. The wavefront correction unit 61 may correct the wavefront of the laser beam L1 to be inputted to the main amplifier MA, based on the wavefront of the laser beam outputted from the main amplifier MA and collimated by the relay optical system R4.

The wavefront correction unit 62 may be disposed upstream of the optical system M1 for steering the laser beam L1 outputted from the driver laser 10F to the chamber 20. A wavefront detection result by the wavefront sensor S2 disposed upstream of the off-axis paraboloidal mirror M2 for focusing the laser beam L1 guided to the chamber 20 in the plasma generation region P1 may be inputted to the wavefront correction unit 62. The wavefront correction unit 62 may correct the wavefront of the laser beam L1 to be focused in the plasma generation region P1, based on the wavefront of the laser beam to be incident on the off-axis paraboloidal mirror M2.

The wavefront correction units and the wavefront sensors according to the sixth embodiment may be disposed, aside from upstream and/or downstream of the main amplifier MA and of the optical system M1, upstream and/or downstream of the preamplifier PA, the saturable absorber cell CE, the relay optical systems R1 through R4. Further, each optical system, such as the preamplifier PA and the main amplifier MA, may be provided with a single pair of the wavefront correction unit and the wavefront sensor, or a single pair of the wavefront correction unit and the wavefront sensor may be provided to multiple optical systems.

Figure 20:
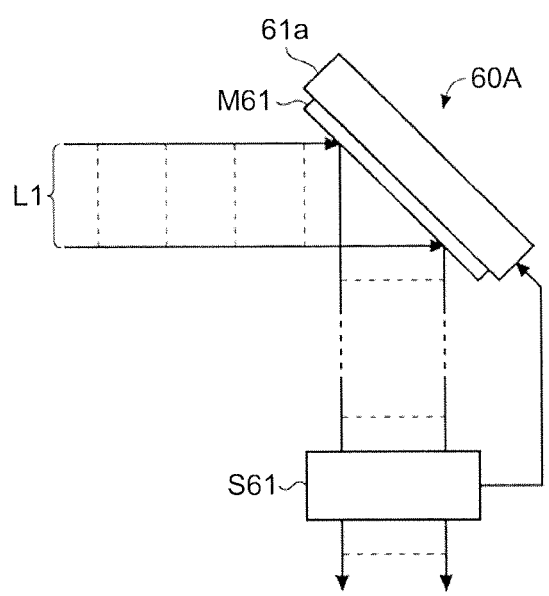
FIG. 20 schematically illustrates the configuration of a wavefront correction unit according to the sixth embodiment.
Figure 21:
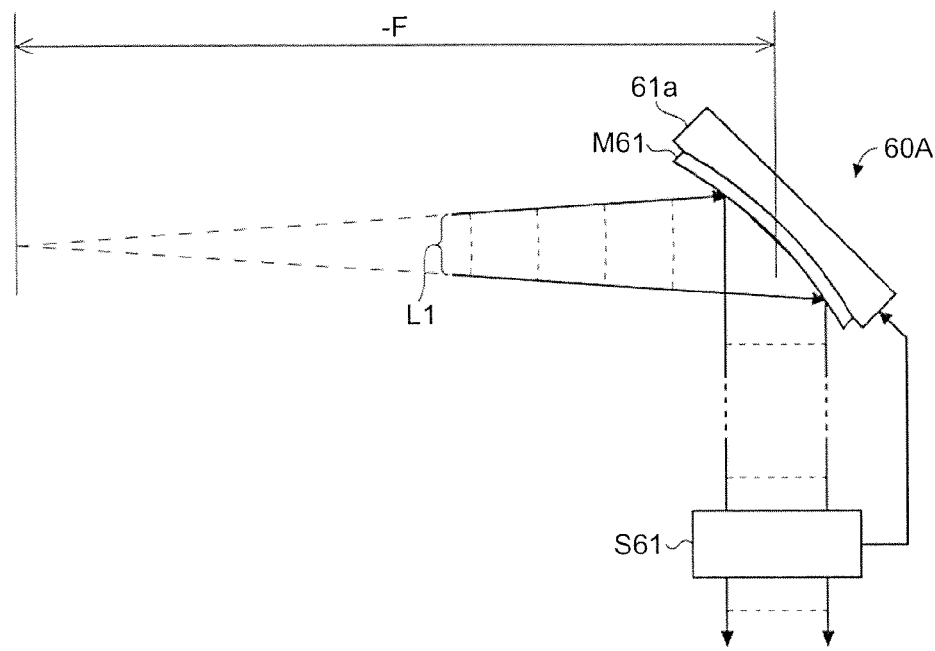
FIG. 21 schematically illustrates the configuration of the wavefront correction unit according to the sixth embodiment.
Figure 22:
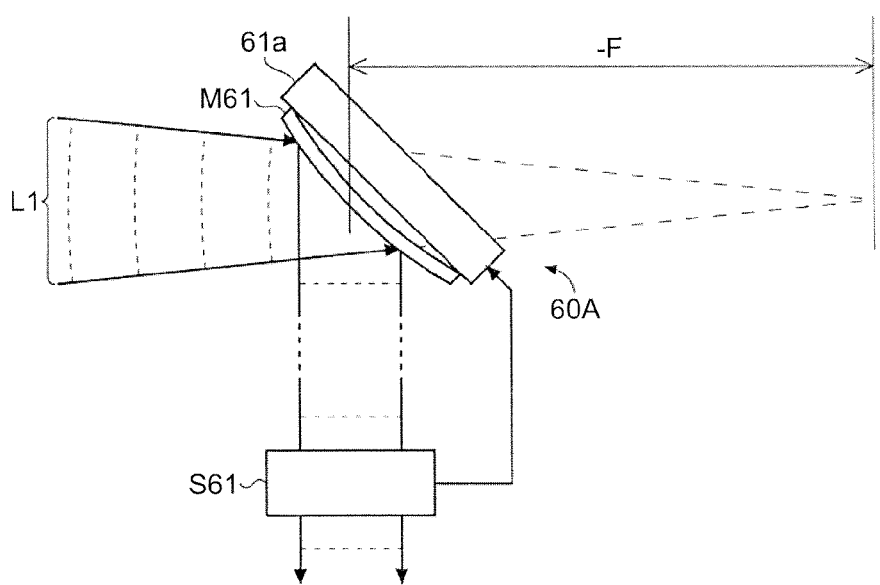
FIG. 22 schematically illustrates the configuration of the wavefront correction unit according to the sixth embodiment.

An example of the wavefront correction unit according to the sixth embodiment will be described in detail with reference to the drawings. The wavefront correction units (for example, the wavefront correction units 61 and 62 shown in FIG. 19) according to the sixth embodiment may be configured similarly to one another; thus, a wavefront correction unit 60A will illustrated as an example hereinafter. FIGS. 20 through 22 schematically illustrate the configuration of the wavefront correction unit according to the sixth embodiment. FIG. 20 illustrates the case where the laser beam L1 incident on the wavefront correction unit 60A is a plane wave; FIG. 21 illustrates the case where the laser beam L1 incident on the wavefront correction unit 60A is a convex wave; and FIG. 22 illustrates the case where the laser beam L1 incident on the wavefront correction unit 60A is a concave wave. In the description to follow, the wavefront correction unit 60A may be disposed so as to be inclined 45 degrees with respect to the axis of incidence (beam axis AX) of the laser beam L1.

As illustrated in FIGS. 20 through 22, the wavefront correction unit 60A may include a mirror portion M61 having a reflective surface and a mirror actuator 61a configured to modify the curvature of the reflective surface of the mirror portion M61 based on the wavefront of the laser beam L1 detected by a wavefront sensor S61. As illustrated in FIG. 20, when the wavefront of the laser beam L1 is plane, the mirror actuator 61a may control the concavities and convexities of the mirror portion M61 based on the wavefront detection result by the wavefront sensor S61 such that the reflective surface of the mirror portion M61 is maintained in a planar state. As illustrated in FIG. 21, when the wavefront of the laser beam L1 is convex, the mirror actuator 61a may modify the shape of the reflective surface of the mirror portion M61 to be concave so that the wavefront of the laser beam L1 to be detected by the wavefront sensor S61 may be planar. As illustrated in FIG. 22, when the wavefront of the laser beam L1 is concave, the mirror actuator 61a may modify the shape of the reflective surface of the mirror portion M61 to be convex so that the wavefront of the laser beam L1 to be detected by the wavefront sensor S61 may be planar.

Modifications of Sixth Embodiment

First Modification

Figure 23:
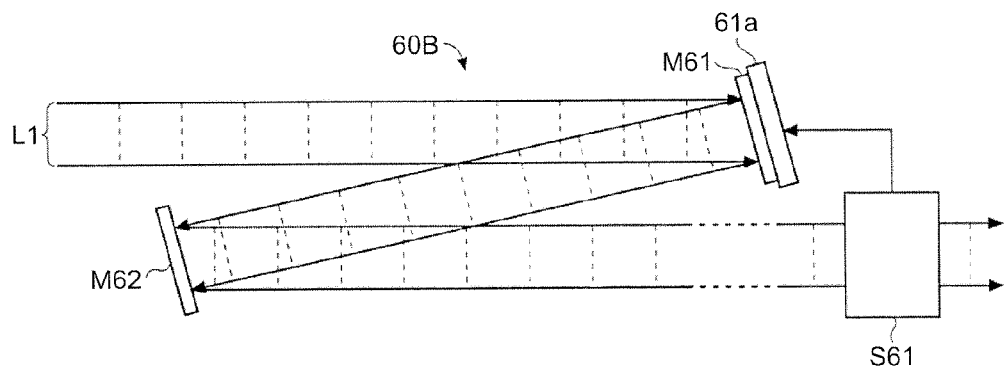
FIG. 23 schematically illustrates the configuration of a wavefront correction unit according to a first modification of the sixth embodiment.
Figure 24:
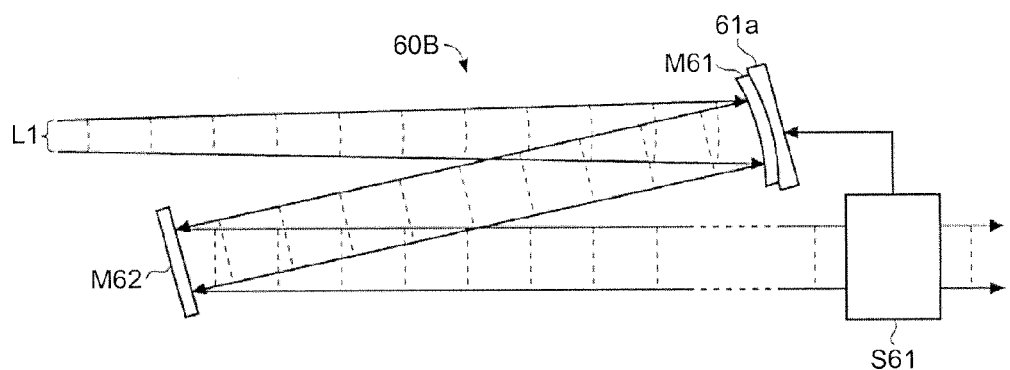
FIG. 24 schematically illustrates the configuration of the wavefront correction unit according to the first modification of the sixth embodiment.
Figure 25:
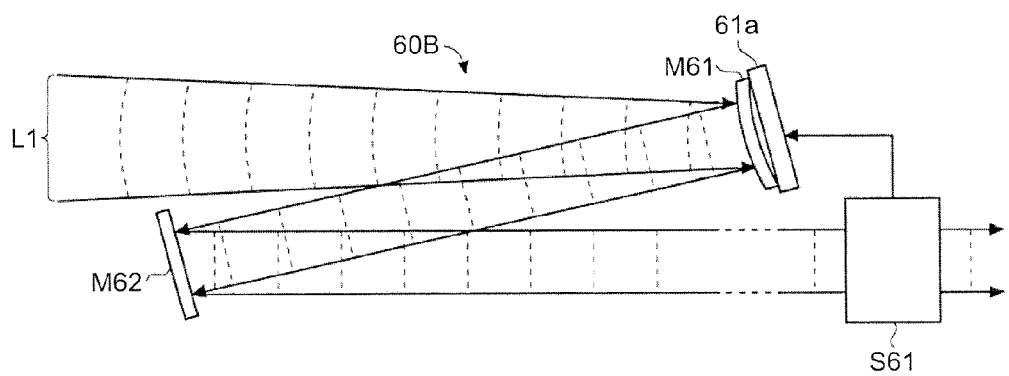
FIG. 25 schematically illustrates the configuration of the wavefront correction unit according to the first modification of the sixth embodiment.

Another example of the wavefront correction unit according to the sixth embodiment will be described in detail with reference to the drawings. FIGS. 23 through 25 schematically illustrate the configuration of a wavefront correction unit according to a first modification of the sixth embodiment. As illustrated in FIG. 23, in the first modification, a wavefront correction unit 60B including an adaptive optical system of Z-shape arrangement, in which the beam axis of the reflected laser beam may form the Z-shape, will be illustrated as an example. FIG. 23 illustrates the case where the laser beam L1 incident on the wavefront correction unit 60B is a plane wave; FIG. 24 illustrates the case where the laser beam L1 incident on the wavefront correction unit 60B is a convex wave; and FIG. 25 illustrates the case where the laser beam L1 incident on the wavefront correction unit 60B is a concave wave.

As illustrated in FIG. 23, as the wavefront correction unit 60A, the wavefront correction unit 60B may include a mirror portion M61 having a reflective surface and a mirror actuator 61a configured to modify the curvature of the reflective surface of the mirror portion M61 based on the wavefront of the laser beam L1 detected by a wavefront sensor S61. The wavefront correction unit 60B may further include a mirror portion M62 arranged to reflect the laser beam L1 which has been reflected by the mirror portion M61 and of which the wavefront has been corrected by the mirror portion M61. The mirror portion M61 provided with a wavefront correction function may be disposed so as to be inclined 2.5 degrees with respect to the axis of incidence (beam axis AX) of the laser beam L1, for example. The mirror portion M62, which may be a flat mirror, for example, may be disposed so as to be inclined 2.5 degrees with respect to the beam axis AX of the laser beam L1 reflected by the mirror portion M61, so that the beam axis AX of the laser beam L1 reflected by the mirror portion M62 is substantially parallel to the beam axis AX of the laser beam L1 to be incident on the mirror portion M61.

Second Modification

Figure 26:
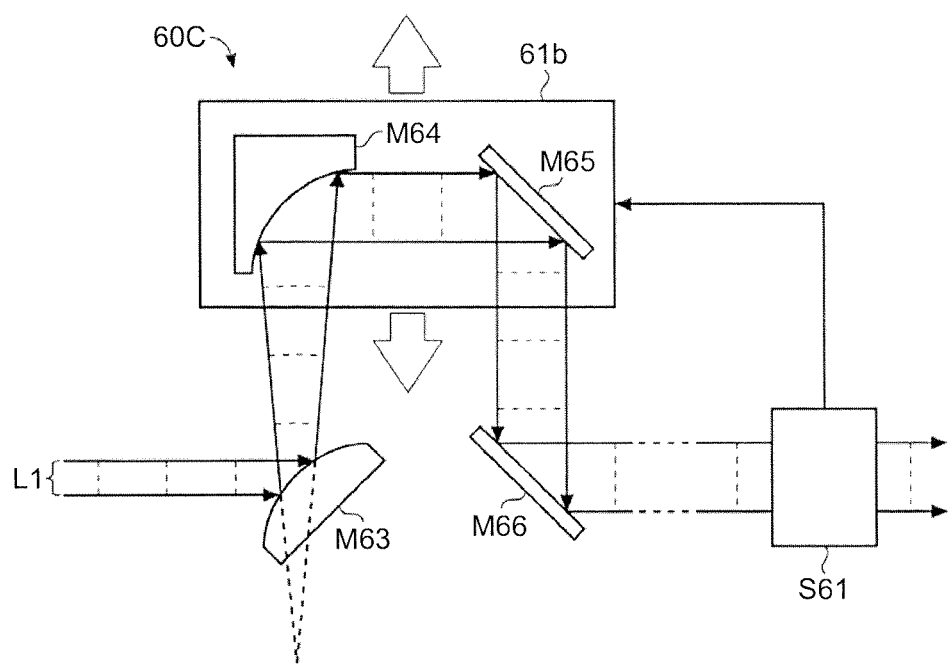
FIG. 26 schematically illustrates the configuration of a wavefront correction unit according to a second modification of the sixth embodiment.

Further, a wavefront correction unit 60C illustrated in FIG. 26 may also be used as the wavefront correction unit according to the sixth embodiment. FIG. 26 schematically illustrates the configuration of a wavefront correction unit according to a second modification of the sixth embodiment. As illustrated in FIG. 26, the wavefront correction unit 60C may include a convex mirror M63, a concave mirror M64, and flat mirrors M65 and M66. The convex mirror M63 may be arranged to expand the laser beam L1 in diameter. The concave mirror M64 may be arranged to collimate the laser beam L1 of which the beam diameter has been expanded. The flat mirrors M65 and M66 may be arranged to bring the beam axis AX of the collimated laser beam L1 back onto the extension of the beam axis AX of the laser beam L1 which has entered the wavefront correction unit 60C. In this configuration, the concave mirror M64 and the flat mirror M65 may be mounted on a common movable plate 61b. The movable plate 61b may be provided with a movement mechanism (not shown). The movement mechanism may change a distance between the convex mirror M63 and the concave mirror M64 based on the wavefront of the laser beam L1 detected by the wavefront sensor S61. With this, the wavefront of the laser beam L1 may be corrected.

Third Modification

Figure 27:
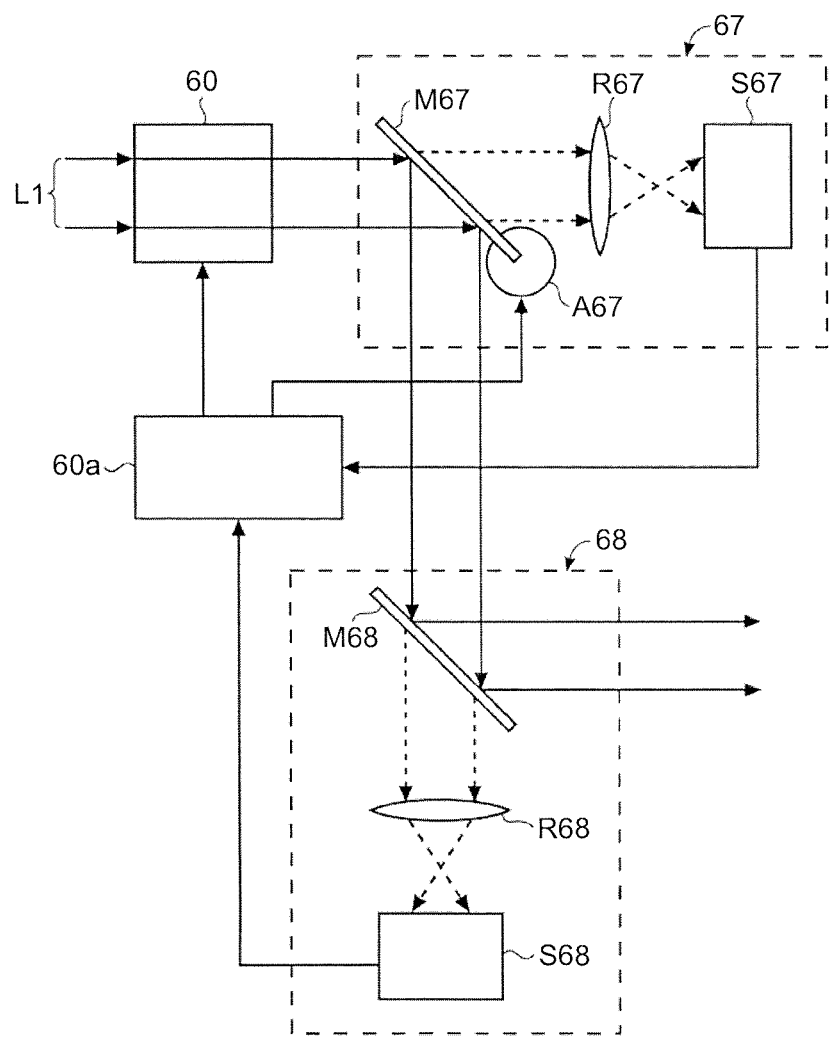
FIG. 27 schematically illustrates the configuration of a wavefront measuring mechanism according to a third modification of the sixth embodiment.

In the embodiments described so far, the wavefront of the laser beam L1 has been measured by the wavefront sensor S61. However, a wavefront measurement mechanism for measuring the wavefront of the laser beam L1 is not limited to the wavefront sensor S61, and can be modified in various ways. Hereinafter, another example of the wavefront measurement mechanism according to the sixth embodiment will be described in detail with reference to the drawings. FIG. 27 schematically illustrates the configuration of a wavefront measurement mechanism according to a third modification of the sixth embodiment. As illustrated in FIG. 27, the wavefront measurement mechanism according to the third modification may include two wavefront measurement units 67 and 68. The wavefront measurement unit 67 may include a half mirror M67, a beam profiler S67, and a lens R67. The half mirror M67 may be configured to reflect part of the laser beam L1 outputted from the wavefront correction unit 60 and transmit the other part thereof. The beam profiler S67 may be configured to measure the beam intensity distribution along and the size of the cross-section of the laser beam L1. The lens R67 may be arranged to image the laser beam L1 transmitted through the half mirror M67 on a photosensitive surface of the beam profiler S67. Similarly, the wavefront measurement unit 68 may include a half mirror M68, a beam profiler S68, and a lens R68. The half mirror M68 may be configured to reflect part of the laser beam L1 reflected by the half mirror M67 and transmit the other part thereof. The beam profiler S68 may be configured to measure the beam intensity distribution along and the size of the cross-section of the laser beam L1. The lens R68 may be configured to image the laser beam L1 transmitted through the half mirror M68 on a photosensitive surface of the beam profiler S68. The wavefront correction unit 60 may be any of the above-described wavefront correction units 60A through 60C. Further, the laser beam L1 to be incident on the wavefront correction unit 60 may be any of the plane wave, the convex wave, and the concave wave.

In the above configuration, the measurement results by the two beam profilers S67 and S68 may be inputted to a wavefront correction unit controller 60a. The wavefront correction unit controller 60a may be configured to control the wavefront correction unit 60 based at least on one of the two inputted measurement results, so that the laser beam L1 may have a predetermined wavefront, a predetermined intensity distribution, and a predetermined beam size.

In this example, the half mirror M67 may be provided with a mirror actuator A67 configured to control an angle of inclination of the half mirror M67 with respect to the beam axis AX of the laser beam L1. The wavefront correction unit controller 60a may be configured to drive the mirror actuator A67 based at least on either one of the two inputted measurement results, so that the laser beam L1 outputted from the upstream wavefront measurement unit 67 is incident appropriately on the downstream wavefront measurement unit 68.

Figure 28:
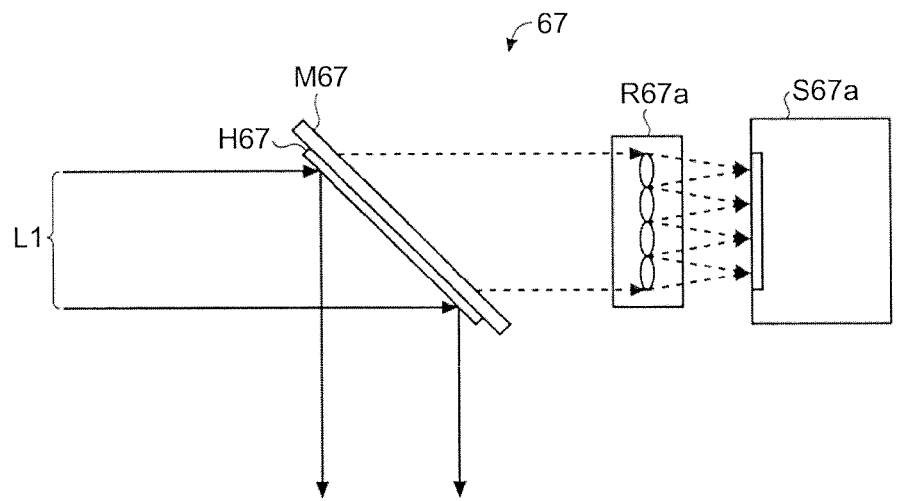
FIG. 28 schematically illustrates the configuration of a wavefront measuring unit according to the third modification of the sixth embodiment.

The wavefront measurement units 67 and 68 may be configured as shown in FIG. 28. FIG. 28 schematically illustrates the configuration of a wavefront measurement unit according to a third modification of the sixth embodiment. The wavefront correction units 67 and 68 may be configured similarly except in that the wavefront correction unit 67 may be provided with the mirror actuator A67; thus, hereinafter, the description will be given with a focus on the wavefront correction unit 67. Further, in the description to follow, for the sake of simplicity, the mirror actuator A67 will be omitted.

As illustrated in FIG. 28, a half mirror coating H67, by which part of the laser beam L1 may be reflected and through which the other part thereof may be transmitted, may be provided on a surface, on which the laser beam L1 is incident, of the half mirror M67 of the wavefront measurement unit 67. The lens R67 may be a micro-lens array R67a configured of tiny focusing lenses being arranged two-dimensionally. Further, the beam profiler S67 may, for example, be an infrared camera S67a capable of acquiring a two-dimensional image of the laser beam L1 focused by the micro-lens array R67a. In this way, the wavefront measurement unit 67 (and 68) may be a so-called Shack-Hartmann wavefront sensor.

Figure 29:
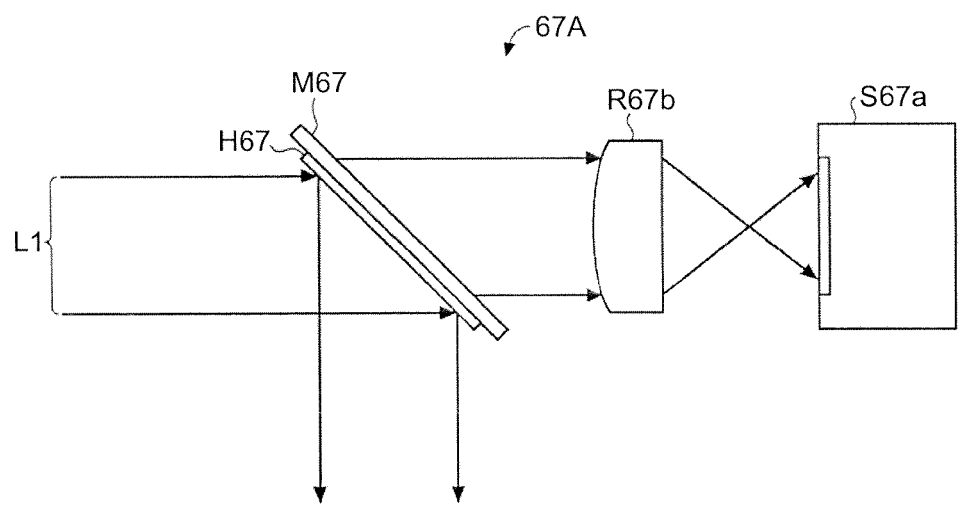
FIG. 29 schematically illustrates the configuration of another wavefront measuring unit according to the third modification of the sixth embodiment.

The wavefront measurement unit 67 illustrated in FIG. 28 may be replaced by a wavefront measurement unit 67A illustrated in FIG. 29. FIG. 29 schematically illustrates the configuration of another wavefront measurement unit according to the third modification of the sixth embodiment. As may be apparent from the comparison between FIGS. 28 and 29, the wavefront measurement unit 67A may be similar in configuration to the wavefront measurement unit 67 illustrated in FIG. 28, but may differ in that the macro-lens array R67a may be replaced by a convex lens R67b. The laser beam L1, having been transmitted through the convex lens R67b, may be imaged on a photosensitive surface of the infrared camera S67a. This configuration may make it possible to measure the beam size of the laser beam L1. Accordingly, controlling the wavefront correction unit 60 based on the detection result may make it possible to adjust the beam size of the laser beam L1.

Figure 30:
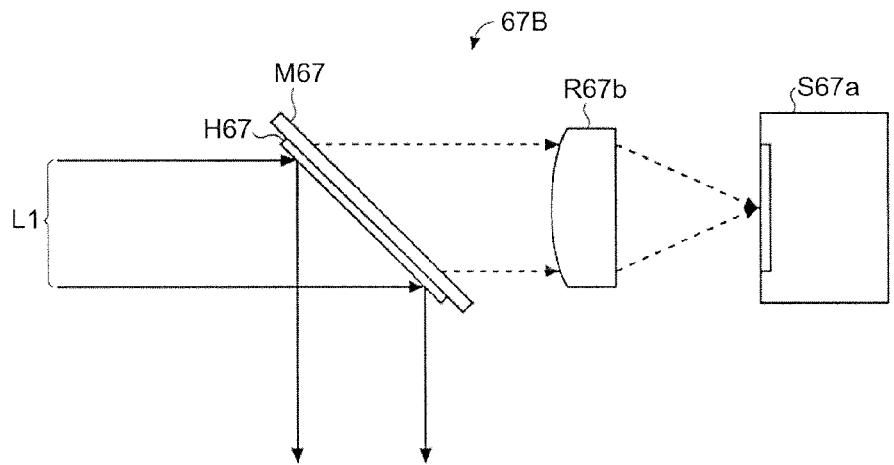
FIG. 30 schematically illustrates the configuration of yet another wavefront measuring unit according to the third modification of the sixth embodiment.

The wavefront measurement unit 67A illustrated in FIG. 29 may be modified into a wavefront measurement unit 67B illustrated in FIG. 30. FIG. 30 schematically illustrates the configuration of another wavefront measurement unit according to the third modification of the sixth embodiment. As may be apparent from the comparison between FIGS. 29 and 30, in this modification, the convex lens R67b may be disposed such that the focus thereof is on the photosensitive surface of the infrared camera S67a. This configuration may make it possible to measure the beam waist of the laser beam L1. Accordingly, controlling the wavefront correction unit 60 based on the detection result may make it possible to adjust the size of the beam waist of the laser beam L1.

Figure 31:
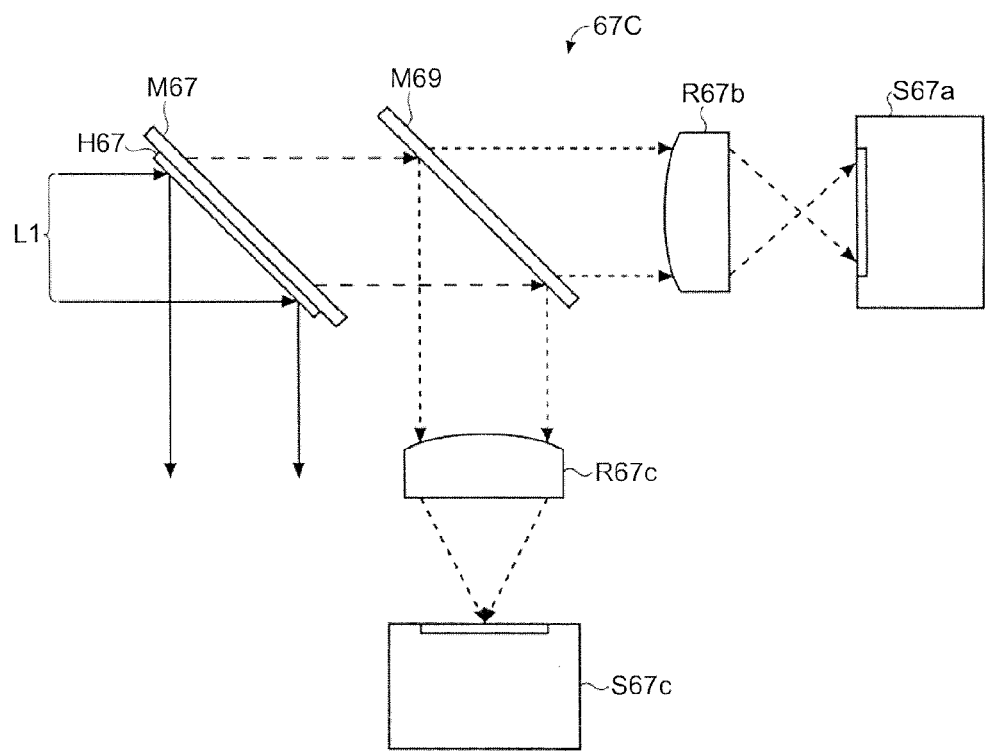
FIG. 31 schematically illustrates the configuration of still another wavefront measuring unit according to the third modification of the sixth embodiment.

Furthermore, the wavefront measurement unit 67 according to the third modification may be replaced by a wavefront measurement unit 67C illustrated in FIG. 31. FIG. 31 schematically illustrates the configuration of yet another wavefront measurement unit according to the third modification of the sixth embodiment. As illustrated in FIG. 31, the wavefront measurement unit 67C may have such configuration that the wavefront measurement unit 67A illustrated in FIG. 29 and the wavefront measurement unit 67B illustrated in FIG. 30 are combined. The laser beam L1 having been transmitted through the half mirror M67 may be split by a half mirror M69, and part thereof may be incident on the convex lens R67b and the infrared camera S67a, which may correspond to a measurement system of the wavefront measurement unit 67A, and on a convex lens R67c and an infrared camera S67c, which may correspond to a measurement system of the wavefront measurement unit 67B. This configuration may make it possible to measure both the size of the wavefront and the beam waist of the laser beam L1. Accordingly, controlling the wavefront correction unit 60 based on the detection result may make it possible to adjust both the beam size of the wavefront and the size of the beam waist of the laser beam L1.

Modifications of Shape of Window Unit and Cross-Sectional Shape of Laser Beam

First Modification

In the above-described embodiments and the modifications thereof, cases where the cross-sectional shape of the laser beam L1, the shape of the opening A1 in the window holder H1, the shape of the flow channel F1 provided inside the window holder H1, and the shape of the outer periphery of the window holder H1 are all circular have been illustrated as examples. However, as has been mentioned above, at least one among the shape of the opening A1 in the window holder H1, the shape of the flow channel F1 provided inside the window holder H1, and the shape of the outer periphery of the window holder H1 may be substantially similar to the shape of the window W1 or to the cross-sectional shape of the laser beam L1. Alternatively, the outer periphery of each of the above-mentioned shapes may be substantially similar to and be oriented in substantially the same direction as the shape of the window W1 or the outer boundary of the irradiation region on the window surface by the laser beam L1. Thus, hereinafter, other examples of respective shapes will be described in detail with reference to the drawings.

Figure 32:
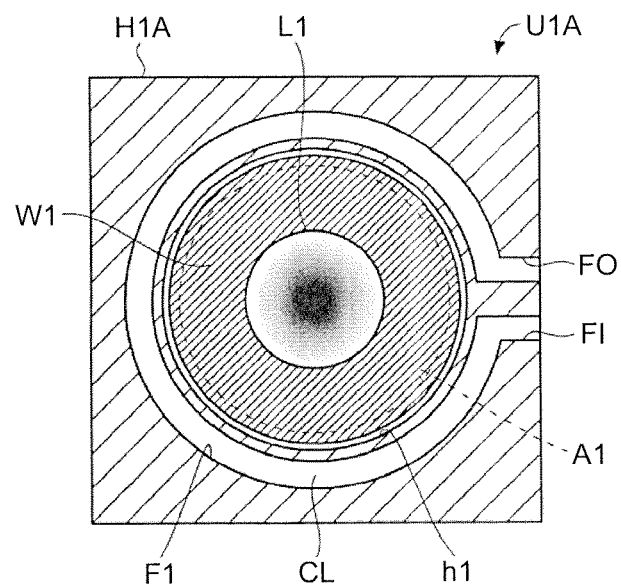
FIG. 32 schematically illustrates a shape of a window unit and a cross-sectional shape of a laser beam according to a first modification of each embodiment of this disclosure.

FIG. 32 schematically illustrates the shape of the window unit and the cross-sectional shape of the laser beam according to a first modification of the embodiments of this disclosure. As illustrated in FIG. 32, the cross-section shape of the laser beam L1 according to the first modification may be circular, as in the above-described embodiments. Meanwhile, the shape of the outer periphery of a window holder H1A of a window unit U1A may be quadrilateral (for example, square). Even with such a configuration, as has been described with reference to FIG. 9 above, the temperature distribution in the window W1 can be made substantially axisymmetric with respect to the center portion C. Further, as has been described with reference to FIG. 10 above, the temperature distribution in the window W1 can be made such that the temperature gradually decreases from the center portion C toward the outer periphery of the window W1.

Second Modification

Figure 33:
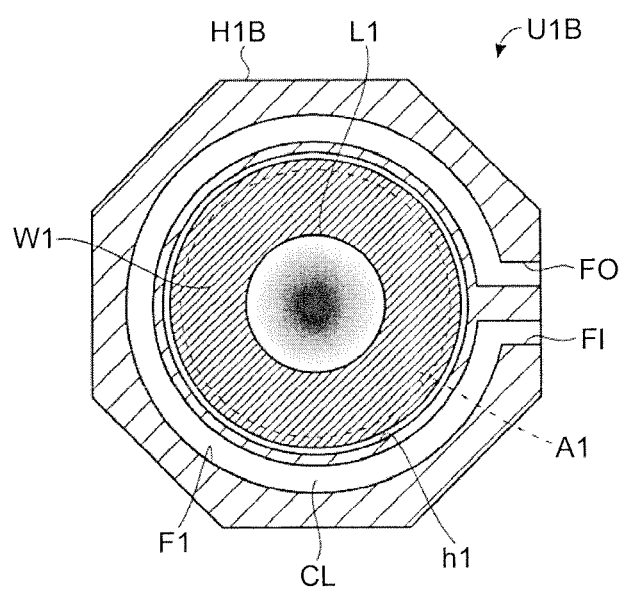
FIG. 33 schematically illustrates a shape of a window unit and a cross-sectional shape of a laser beam according to a second modification of each embodiment of this disclosure.

The shape of the outer periphery of the window holder may be modified as in the configuration shown in FIG. 33. FIG. 33 schematically illustrates the shape of the flow channel and the cross-sectional shape of the laser beam according to a second modification of the embodiments of this disclosure. As illustrated in FIG. 33, in a window unit U1B according to the second modification, the shape of the outer periphery of a window holder H1B may be polygonal, such as a regular octagon. Even with such a configuration, similar effects to those described above may be obtained.

Third Modification

Figure 34:
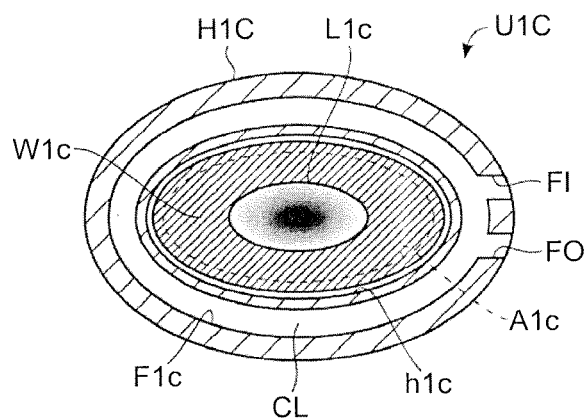
FIG. 34 schematically illustrates a shape of a window unit and a cross-sectional shape of a laser beam according to a third modification of each embodiment of this disclosure.

The cross-sectional shape of the laser beam may be modified as in the configuration shown in FIG. 34. FIG. 34 schematically illustrates the shape of the flow channel and the cross-sectional shape of the laser beam according to a third modification of the embodiments of this disclosure. As illustrated in FIG. 34, in the third modification, the cross-sectional shape of a laser beam L1c may be elliptic. Meanwhile, at least one among the shape of an opening A1c of a window holder H1C of a window unit U1C, the shape of a flow channel F1c provided inside the window holder H1C, and the shape of the outer periphery of the window holder H1C may be substantially similar to the shape of a window W1c, which may be elliptic in shape, or to the cross-sectional shape of the laser beam L1c. Even with such a configuration, similar effects to those described above may be obtained.

Fourth Modification

Figure 35:
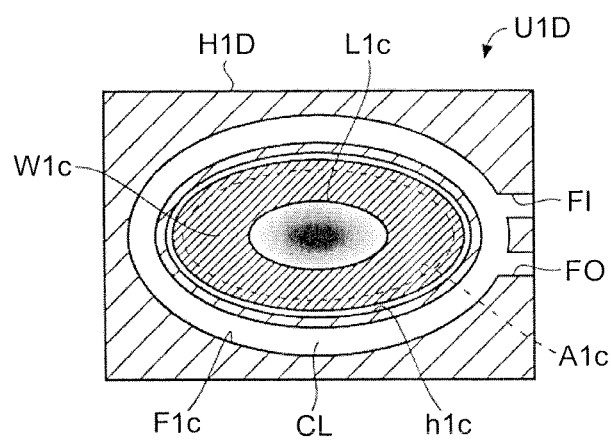
FIG. 35 schematically illustrates a shape of a window unit and a cross-sectional shape of a laser beam according to a fourth modification of each embodiment of this disclosure.

The shape of the outer periphery of the window holder according to the third modification shown in FIG. 34 may be modified as in the configuration shown in FIG. 35. FIG. 35 schematically illustrates the shape of the flow channel and the cross-sectional shape of the laser beam according to a fourth modification of the embodiments of this disclosure. As illustrated in FIG. 35, in a window unit U1D according to the fourth modification, the shape of the outer periphery of a window holder H1D may be quadrilateral (for example, a square). Even with such a configuration, similar effects to those described above may be obtained.

Fifth Modification

Figure 36:
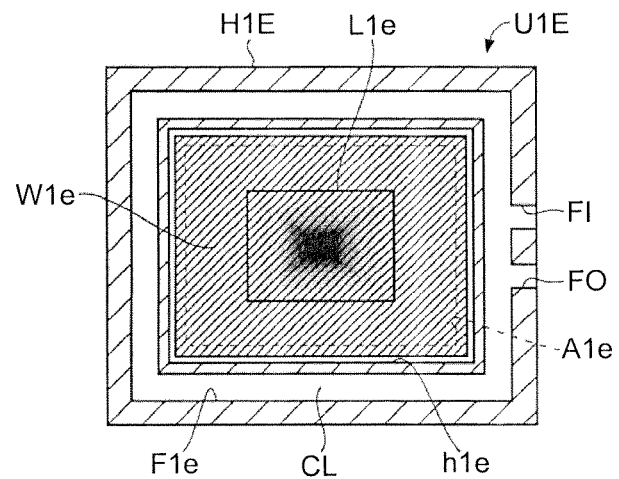
FIG. 36 schematically illustrates a shape of a window unit and a cross-sectional shape of a laser beam according to a fifth modification of each embodiment of this disclosure.

The cross-sectional shape of the laser beam may be modified as in the configuration shown in FIG. 36. FIG. 36 schematically illustrates the shape of the flow channel and the cross-sectional shape of the laser beam according to a fifth modification of the embodiments of this disclosure. As illustrated in FIG. 36, in the fifth modification, the cross-sectional shape of a laser beam L1e may be quadrilateral, such as a square, a rectangle, and so forth. Meanwhile, at least one among the shape of an opening A1e in a window holder H1E of a window unit U1E, the shape of a flow channel F1e provided inside the window holder H1E, and the shape of the outer periphery of the window holder H1E may be substantially similar to the shape of the window W1e, which may be quadrilateral in shape, such as a square, a rectangle, and so forth, or to the cross-sectional shape of the laser beam L1e. Even with such a configuration, similar effects to those described above may be obtained.

Sixth Modification

Figure 37:
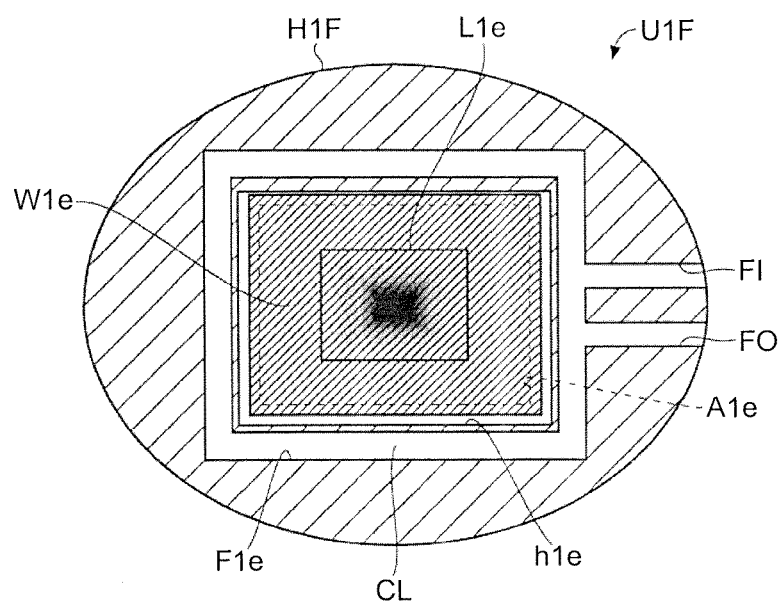
FIG. 37 schematically illustrates a shape of a window unit and a cross-sectional shape of a laser beam according to a sixth modification of each embodiment of this disclosure.

The shape of the outer periphery of the window holder according to the fifth modification shown in FIG. 36 may be modified as in the configuration shown in FIG. 37. FIG. 37 schematically illustrates the shape of the flow channel and the cross-sectional shape of the laser beam according to a sixth modification of the embodiments of this disclosure. As illustrated in FIG. 37, in a window unit U1F according to the sixth modification, the shape of the outer periphery of a window holder H1F may be circular, elliptic, and so forth. Even with such a configuration, similar effects to those described above may be obtained.

Seventh Modification

Figure 38:
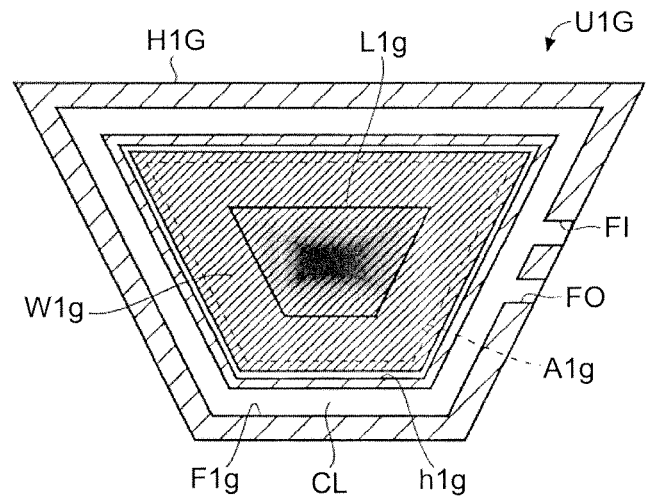
FIG. 38 schematically illustrates a shape of a window unit and a cross-sectional shape of a laser beam according to a seventh modification of each embodiment of this disclosure.

The cross-sectional shape of the laser beam may be modified as in the configuration shown in FIG. 38. FIG. 38 schematically illustrates the shape of the flow channel and the cross-sectional shape of the laser beam according to a seventh modification of the embodiments of this disclosure. As illustrated in FIG. 38, in the seventh modification, the cross-sectional shape of a laser beam L1g may be quadrilateral, such as a square, a rectangle, and so forth. Meanwhile, at least one among the shape of an opening A1g in a window holder H1G of a window unit U1G, the shape of a flow channel F1g provided inside the window holder H1G, and the shape of the outer periphery of the window holder H1G may be substantially similar to the shape of the window W1g, which may be quadrilateral in shape, such as a square, a rectangle, and so forth, or to the cross-sectional shape of the laser beam L1g. Even with such a configuration, similar effects to those described above may be obtained.

Eighth Modification

Figure 39:
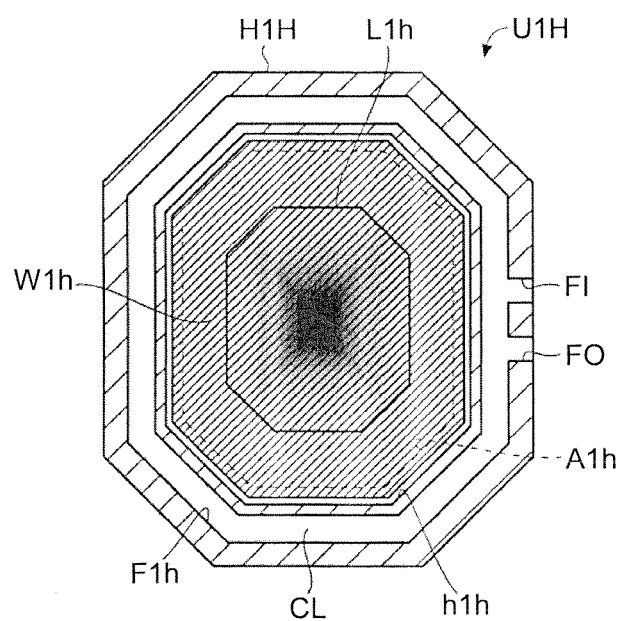
FIG. 39 schematically illustrates a shape of a window unit and a cross-sectional shape of a laser beam according to an eighth modification of each embodiment of this disclosure.

The cross-sectional shape of the laser beam may be modified as in the configuration shown in FIG. 39. FIG. 39 schematically illustrates the shape of the flow channel and the cross-sectional shape of the laser beam according to an eighth modification of the embodiments of this disclosure. As illustrated in FIG. 39, in the eighth modification, the cross-sectional shape of a laser beam L1h may be polygonal with five or more vertices. Meanwhile, at least one among the shape of an opening A1h in a window holder H1H of a window unit U1H, the shape of a flow channel F1h provided inside the window holder H1H, and the shape of the outer periphery of the window holder H1H may be substantially similar to the shape of the window H1h, which may be polygonal in shape, or to the cross-sectional shape of the laser beam L1h. Even with such a configuration, similar effects to those described above may be obtained.

The above descriptions are merely illustrative and not limiting. Accordingly, it is apparent to those skilled in the art that modifications can be made to the embodiments of this disclosure without departing from the scope of this disclosure.

The terms used in this specification and the appended claims should be interpreted as "non-limiting." For example, the terms "include" and "be included" should be interpreted as "not limited to the stated elements." The term "have" should be interpreted as "not limited to the stated elements." Further, the modifier "one (a/an)" should be interpreted as at least one or "one or more."

The invention claimed is:

1. A window unit, comprising:
a window configured to allow a laser beam to be transmitted therethrough; and
a holder for holding the window at a periphery thereof, the holder being provided with a flow channel thereinside configured to allow a fluid to flow,
wherein an absolute value of a difference $\Delta\epsilon$ [ppm] between a thermal expansion coefficient of a material constituting the window and a thermal expansion coefficient of a material constituting the holder satisfies Expression 1 below, where D [mm] is an outer diameter of the window:

$$|\Delta\epsilon| \leq \tfrac{1}{2} D \times 10^{-3} \qquad \text{Expression 1.}$$

2. The window unit according to claim 1, wherein a shape of the flow channel is substantially similar to the periphery of the window, and the flow channel lays along the periphery of the window.

3. The window unit according to claim 1, wherein a shape of the flow channel is substantially similar to a cross-sectional shape of the laser beam.

4. The window unit according to claim 1, wherein the window is fixed to the holder on at least one surface of the window by any of deposition, fusion, brazing, and adhesion.

5. The window unit according to claim 1, wherein the window is disc-shaped, the flow channel is annular in shape, and the flow channel is located at either inner or outer side relative to the periphery of the window when viewed in a direction perpendicular to a surface of the window.

6. The window unit according to claim 1, wherein the flow channel includes an annular part and connection parts, the annular part is discontinued inside the holder at a part thereof, and the connection parts extend from discontinued ends of the annular part and open at a surface of the holder, respectively.

7. The window unit according to claim 1, wherein the holder includes a base and a cover, the base contacts with a periphery on one surface of the window, and the cover contacts with a periphery on the other surface of the window.

8. The window unit according to claim 7, wherein the cover includes a first groove on a surface thereof which contacts with the base,
the base includes a second groove on a surface thereof which contacts with the cover, the second groove being arranged to align with the first groove, and
the flow channel is constituted of the first and second grooves.

9. The window unit according to claim 1, wherein the window is arranged such that the laser beam is incident on a surface of the window with an angle inclined with respect to the surface.

10. A window device, comprising:
a window configured to allow a laser beam to be transmitted therethrough;
a holder for holding the window at a periphery thereof, the holder being provided with an inlet opened in a surface of the holder, an outlet opened in the surface of the holder, and a flow channel thereinside configured to allow communication between the inlet and the outlet to allow a fluid to flow; and a cooling unit configured to have a cooling medium flow into the holder via the inlet, wherein an absolute value of a difference $\Delta\epsilon$ [ppm] between a thermal expansion coefficient of a material constituting the window and a thermal expansion coefficient of a material constituting the holder satisfies Expression 1 below, where D [mm] is an outer diameter of the window:

$$|\Delta\epsilon| \leq 1/(2D \times 10^{-3}) \quad \text{Expression 1.}$$

11. A laser apparatus, comprising:

an output unit configured to output a laser beam;

an amplification unit configured to amplify the laser beam; and a window unit including a window and a holder, the window being provided at least at one side of input and output sides of the laser beam in the amplification unit and being configured to allow the laser beam to be transmitted therethrough, and the holder being provided with a flow channel thereinside configured to allow a fluid to flow, wherein an absolute value of a difference $\Delta\epsilon$ [ppm] between a thermal expansion coefficient of a material constituting the window and a thermal expansion coefficient of a material constituting the holder satisfies Expression 1 below, where D [mm] is an outer diameter of the window:

$$|\Delta\epsilon| \leq \tfrac{1}{2} D \times 10^{-3} \quad \text{Expression 1.}$$

12. The laser apparatus according to claim 11, further comprising a wavefront correction unit configured to correct a wavefront of the laser beam amplified in the amplification unit.

13. A system for generating extreme ultraviolet light, the system comprising:

a window configured to allow a laser beam to be transmitted therethrough;

a holder for holding the window at a periphery thereof, the holder being provided with an inlet opened in a surface of the holder, an outlet opened in the surface of the holder, and a flow channel thereinside configured to allow communication between the inlet and the outlet to allow a fluid to flow;

a cooling unit configured to have a cooling medium to flow into the holder via the inlet;

a chamber to which the holder is mounted;

a target supply unit configured to supply a target material into the chamber; and a collector mirror configured to collect light emitted from plasma generated when the target material is irradiated with the laser beam, wherein an absolute value of a difference $\Delta\epsilon$ [ppm] between a thermal expansion coefficient of a material constituting the window and a thermal expansion coefficient of a material constituting the holder satisfies Expression 1 below, where D [mm] is an outer diameter of the window:

$$|\Delta\epsilon| \leq \tfrac{1}{2} D \times 10^{-3} \quad \text{Expression 1.}$$

* * * * *